United States Patent
Naidoo et al.

(10) Patent No.: US 12,327,012 B2
(45) Date of Patent: Jun. 10, 2025

(54) SYSTEMS AND METHODS FOR CONFIGURING AND PRESENTING A DISPLAY NAVIGATION HIERARCHY IN A PROCESS PLANT

(71) Applicant: FISHER-ROSEMOUNT SYSTEMS, INC., Round Rock, TX (US)

(72) Inventors: Julian K. Naidoo, Cedar Park, TX (US); Daniel R. Strinden, Austin, TX (US); Christopher Ian Sarmiento Uy, Metro Manila (PH); Cindy A. Scott, Georgetown, TX (US); Mark J. Nixon, Round Rock, TX (US); Edmar Ahmil Oñas Abraham, Kawit (PH); Federico Jose Guerrero Aragon, Parañaque (PH); Prashant Joshi, Leicester (GB)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 16/121,214

(22) Filed: Sep. 4, 2018

(65) Prior Publication Data
US 2019/0102075 A1    Apr. 4, 2019

Related U.S. Application Data

(60) Provisional application No. 62/566,679, filed on Oct. 2, 2017.

(51) Int. Cl.
*G06F 3/04847* (2022.01)
*G05B 19/418* (2006.01)
(Continued)

(52) U.S. Cl.
CPC ... *G06F 3/04847* (2013.01); *G05B 19/41835* (2013.01); *G06F 3/0482* (2013.01);
(Continued)

(58) Field of Classification Search
None
See application file for complete search history.

(56) References Cited

U.S. PATENT DOCUMENTS

| 6,636,250 B1 | 10/2003 | Gasser |
| 7,043,311 B2 | 5/2006 | Nixon et al. |

(Continued)

FOREIGN PATENT DOCUMENTS

| CN | 1950761 A | 4/2007 |
| CN | 1950763 A | 4/2007 |

(Continued)

OTHER PUBLICATIONS

Search Report for Application No. GB1815507.7, dated Mar. 18, 2019.

(Continued)

*Primary Examiner* — Matthew Ell
*Assistant Examiner* — David V Luu
(74) *Attorney, Agent, or Firm* — MARSHALL, GERSTEIN & BORUN LLP

(57) ABSTRACT

Techniques for configuring layouts and display view hierarchies and presenting display views in an operating environment of a process plant according to the layouts and display view hierarchies include providing graphical user controls at a graphical display configuration application for defining a layout. The layouts indicate a manner in which divide one or several display screens into one or several display regions, where each display region presents a display view that includes indications of process control elements. The graphical display configuration application also includes graphical user controls for defining a display view hierarchy of the display views by assigning levels of detail to the display views and designating some of the display views as subviews of other display views. An operator (Continued)

application obtains the defined layout and display view hierarchy and presents the display views at an operator workstation according to the obtained layout and/or display view hierarchy.

17 Claims, 15 Drawing Sheets

(51) Int. Cl.
*G06F 3/0482* (2013.01)
*G06F 3/0484* (2022.01)
*G06F 3/04845* (2022.01)
*G06F 3/0486* (2013.01)
*G06F 3/14* (2006.01)
*G06F 40/166* (2020.01)
*G06F 40/58* (2020.01)
*G06T 11/20* (2006.01)
*G09G 5/14* (2006.01)
*G06T 11/60* (2006.01)

(52) U.S. Cl.
CPC ........ *G06F 3/0484* (2013.01); *G06F 3/04845* (2013.01); *G06F 3/0486* (2013.01); *G06F 3/1446* (2013.01); *G06F 40/166* (2020.01); *G06F 40/58* (2020.01); *G06T 11/206* (2013.01); *G09G 5/14* (2013.01); *G05B 19/41845* (2013.01); *G05B 2219/31418* (2013.01); *G05B 2219/31467* (2013.01); *G05B 2219/31472* (2013.01); *G05B 2219/32128* (2013.01); *G05B 2219/45226* (2013.01); *G06F 2203/04803* (2013.01); *G06T 11/60* (2013.01); *G06T 2200/24* (2013.01); *G06T 2210/36* (2013.01)

(56) References Cited

U.S. PATENT DOCUMENTS

| | | | |
|---|---|---|---|
| 7,647,126 B2 | 1/2010 | Blevins et al. | |
| 7,716,567 B1 | 5/2010 | Retlich | |
| 7,971,151 B2 | 6/2011 | Nixon et al. | |
| 10,180,681 B2 | 1/2019 | Nixon et al. | |
| 10,444,949 B2 | 10/2019 | Scott et al. | |
| 2002/0133523 A1 | 9/2002 | Ambler et al. | |
| 2003/0009710 A1 | 1/2003 | Grant | |
| 2004/0153804 A1 | 8/2004 | Blevins et al. | |
| 2005/0012608 A1 | 1/2005 | Havekost et al. | |
| 2005/0222698 A1 | 10/2005 | Eryurek et al. | |
| 2005/0251747 A1 | 11/2005 | Dolling et al. | |
| 2006/0085765 A1 | 4/2006 | Peterson et al. | |
| 2006/0206866 A1 | 9/2006 | Eldrige et al. | |
| 2007/0061786 A1 | 3/2007 | Zhou et al. | |
| 2008/0276189 A1 | 11/2008 | Dawson | |
| 2008/0294424 A1 | 11/2008 | Naito et al. | |
| 2009/0064019 A1 | 3/2009 | Cahill et al. | |
| 2009/0077055 A1 | 3/2009 | Dillon et al. | |
| 2009/0259952 A1 | 10/2009 | Nakagawa et al. | |
| 2010/0115434 A1 | 5/2010 | Yagi et al. | |
| 2010/0188410 A1 | 7/2010 | Gilbert et al. | |
| 2010/0293461 A1 | 11/2010 | Boezeman et al. | |
| 2011/0029102 A1* | 2/2011 | Campney | G05B 17/02 |
| | | | 700/83 |
| 2011/0072382 A1 | 3/2011 | Caldwell et al. | |
| 2011/0126142 A1* | 5/2011 | Zhou | G05B 19/4183 |
| | | | 715/771 |
| 2011/0282630 A1 | 11/2011 | Rikkola et al. | |
| 2012/0041570 A1 | 2/2012 | Jones et al. | |
| 2012/0054599 A1 | 3/2012 | Nixon et al. | |
| 2012/0259436 A1 | 10/2012 | Resurreccion et al. | |
| 2013/0147630 A1 | 6/2013 | Nakaya et al. | |
| 2013/0258403 A1 | 10/2013 | Kawai | |
| 2014/0100668 A1 | 4/2014 | Jundt et al. | |
| 2014/0108985 A1 | 4/2014 | Scott et al. | |
| 2014/0278312 A1 | 9/2014 | Nixon et al. | |
| 2014/0282215 A1 | 9/2014 | Grubbs et al. | |
| 2014/0324378 A1 | 10/2014 | Elston et al. | |
| 2015/0193418 A1 | 7/2015 | Koska et al. | |
| 2015/0227533 A1 | 8/2015 | Goldstein et al. | |
| 2015/0341469 A1 | 11/2015 | Lawson et al. | |
| 2015/0347394 A1 | 12/2015 | Hirama et al. | |
| 2015/0347396 A1 | 12/2015 | Goldberger et al. | |
| 2015/0351469 A1 | 12/2015 | McGovern | |
| 2015/0378703 A1* | 12/2015 | Govindaraju | G06F 8/20 |
| | | | 717/174 |
| 2016/0323392 A1 | 11/2016 | Lawson et al. | |
| 2017/0116297 A1 | 4/2017 | Wittenburg | |
| 2017/0160904 A1* | 6/2017 | Tene | G06F 3/04842 |
| 2017/0177155 A1 | 6/2017 | Zhou et al. | |
| 2017/0255192 A1 | 9/2017 | Thwaites et al. | |
| 2017/0337321 A1* | 11/2017 | Hoford | G06F 8/34 |
| 2018/0101371 A1* | 4/2018 | Flanakin | G06F 8/60 |
| 2018/0275945 A1* | 9/2018 | Hamada | G06F 3/1454 |
| 2018/0314391 A1* | 11/2018 | Beerana | G06F 3/147 |
| 2019/0034066 A1* | 1/2019 | Nayak | F24F 11/65 |

FOREIGN PATENT DOCUMENTS

| | | |
|---|---|---|
| CN | 1950765 A | 4/2007 |
| CN | 1950767 A | 4/2007 |
| CN | 1997948 A | 7/2007 |
| CN | 101135891 A | 3/2008 |
| CN | 101460911 A | 6/2009 |
| CN | 101473318 A | 7/2009 |
| CN | 101506775 A | 8/2009 |
| CN | 101893861 A | 11/2010 |
| CN | 101943994 A | 1/2011 |
| CN | 102043403 A | 5/2011 |
| CN | 102227692 A | 10/2011 |
| CN | 102269989 A | 12/2011 |
| CN | 102707650 A | 10/2012 |
| CN | 102782636 A | 11/2012 |
| CN | 104238945 A | 12/2014 |
| CN | 104267677 A | 1/2015 |
| CN | 104331211 A | 2/2015 |
| CN | 104838324 A | 8/2015 |
| CN | 104903799 A | 9/2015 |
| CN | 105094832 A | 11/2015 |
| CN | 105190459 A | 12/2015 |
| CN | 106164834 A | 11/2016 |
| CN | 106896762 A | 6/2017 |
| CN | 106933207 A | 7/2017 |
| DE | 10 2006 056 858 A1 | 6/2007 |
| GB | 2 495 878 A | 4/2013 |
| JP | H02-128299 A | 5/1990 |
| JP | H02-285496 A | 11/1990 |
| JP | H09-006429 A | 1/1997 |
| JP | H10-207530 A | 8/1998 |
| JP | H10-307623 A | 11/1998 |
| JP | H11-237914 A | 8/1999 |
| JP | H11-327627 A | 11/1999 |
| JP | 2000-194472 A | 7/2000 |
| JP | 2000-347779 A | 12/2000 |
| JP | 2001-175322 A | 6/2001 |
| JP | 2002-83311 A | 3/2002 |
| JP | 2003-050623 A | 2/2003 |
| JP | 2003-67048 A | 3/2003 |
| JP | 2004-021831 A | 1/2004 |
| JP | 2004-511829 A | 4/2004 |
| JP | 2004-199656 A | 7/2004 |
| JP | 2005-174129 A | 6/2005 |
| JP | 2006-015623 A | 1/2006 |
| JP | 2007-536631 A | 12/2007 |
| JP | 2007-536635 A | 12/2007 |
| JP | 2007-537513 A | 12/2007 |
| JP | 2008-097285 A | 4/2008 |
| JP | 2009-139492 A | 6/2009 |
| JP | 2009-169628 A | 7/2009 |
| JP | 2009-238219 A | 10/2009 |
| JP | 2009-277220 A | 11/2009 |
| JP | 2011-197933 A | 10/2011 |
| JP | 2011-209127 A | 10/2011 |

(56) References Cited

FOREIGN PATENT DOCUMENTS

| | | |
|---|---|---|
| JP | 2012-504291 A | 2/2012 |
| JP | 2012-69026 A | 4/2012 |
| JP | 2012-99063 A | 5/2012 |
| JP | 2012-168776 A | 9/2012 |
| JP | 2012-174179 A | 9/2012 |
| JP | 2013-109644 A | 6/2013 |
| JP | 2013-145548 A | 7/2013 |
| JP | 2013-182308 A | 9/2013 |
| JP | 2013-205285 A | 10/2013 |
| JP | 2015-18422 A | 1/2015 |
| JP | 2016-504640 A | 2/2016 |
| JP | 2016-505909 A | 2/2016 |
| JP | 2016-031560 A | 3/2016 |
| JP | 2016-033799 A | 3/2016 |
| JP | 2016-517582 A | 6/2016 |
| JP | 2016-201694 A | 12/2016 |
| JP | 2017-45436 A | 3/2017 |
| JP | 2017-76391 A | 4/2017 |
| JP | 2017-527869 A | 9/2017 |
| JP | 2017-537513 A | 12/2017 |
| WO | WO-00/67117 A2 | 11/2000 |
| WO | WO-2007/091331 A1 | 8/2007 |

OTHER PUBLICATIONS

Search Report for Application No. GB1815508.5, dated Mar. 15, 2019.
Search Report for Application No. GB1815509.3, dated Mar. 19, 2019.
"Configuration Software Suite," DeltaV Product Data Sheet (2013).
"Control Studio On-Line," DeltaV Distributed Control System (2013).
"DeltaV Operate Themes," DeltaV Distributed Control System (2016).
"DeltaV™ Operate," DeltaV Distributed Control System (2017).
"Human Machine Interfaces for Process Automation Systems," American National Standard (2015).
"Operator Station Software Suite," DeltaV Product Data Sheet (2016).
CIE2000 Calculator. Publicly available prior to Sep. 4, 2018. Retreived from the Internet at: <URL:http://colormine.org/delta-e-calculator/cie2000>.
Rosenholtz et al., "Measuring Visual Clutter," Journal of Vision, 7(2):1-22 (2007).
Examination Report for Application No. GB1815507.7, dated Feb. 3, 2022.
Notice of Reason for Rejection for Japanese Application No. 2018-187548, dated Nov. 29, 2022.
Notice of Reason for Rejection for Japanese Application No. 2018-187549, dated Nov. 29, 2022.
Notice of Reason for Rejection for Japanese Application No. 2018-187550, dated Nov. 29, 2022.
Notice of Reason for Rejection for Japanese Application No. 2018-187551, dated Nov. 29, 2022.
Notice of Reason for Rejection for Japanese Application No. 2018-187552, dated Nov. 20, 2022.
Notice of Reason for Rejection for Japanese Application No. 2018-187553, dated Nov. 29, 2022.
Combined Search and Examination Report for Application No. GB2205451.4, dated Sep. 21, 2022.
Examination Report for Application No. GB1815509.3, dated Sep. 23, 2022.
Examination Report for Application No. GB1815511.9, dated Mar. 3, 2022.
Notice of Reason for Rejection for Japanese Application No. 2018-186803, dated Jul. 26, 2022.
Notice of Reason for Rejection for Japanese Application No. 2018-187545, dated Nov. 15, 2022.
Notice of Reason for Rejection for Japanese Application No. 2018-187546, dated Nov. 15, 2022.
Notice of Reason for Rejection for Japanese Application No. 2018-187547, dated Nov. 1, 2022.
Notification of First Office Action for Chinese Application No. 201811161688.6, dated Nov. 30, 2023.
Notification of First Office Action for Chinese Application No. 20181116328.9, dated Oct. 28, 2023.
Notification of First Office Action for Chinese Application No. 201811163428.2, dated Oct. 27, 2023.
Notification of First Office Action for Chinese Application No. 201811161646.2, dated Feb. 26, 2024.
Notification of Second Office Action for Chinese Application No. 201811163530.2, dated Mar. 16, 2024.
Final Decision of Rejection for Japanese Application No. 2018-187546, dated Oct. 3, 2023.
Final Decision of Rejection for Japanese Application No. 2018-187547, dated May 30, 2023.
Final Decision of Rejection for Japanese Application No. 2018-187549, dated Aug. 1, 2023.
Final Decision of Rejection for Japanese Application No. 2018-187551, dated Aug. 29, 2023.
Notice of Reason for Rejection for Japanese Application No. 2018-187545, dated May 16, 2023.
Notice of Reason for Rejection for Japanese Application No. 2018-187546, dated May 16, 2023.
Notice of Reason for Rejection for Japanese Application No. 2018-187548, dated May 16, 2023.
Notice of Reason for Rejection for Japanese Application No. 2018-187549, dated Apr. 4, 2023.
Notice of Reason for Rejection for Japanese Application No. 2018-187550, dated Apr. 4, 2023.
Notice of Reason for Rejection for Japanese Application No. 2018-187551, dated Apr. 4, 2023.
Notification of First Office Action for Chinese Application No. 201811161491.2, dated Jun. 29, 2023.
Notification of First Office Action for Chinese Application No. 201811161802.5, dated Nov. 7, 2023.
Notification of First Office Action for Chinese Application No. 201811161870.1, dated Oct. 8, 2023.
Notification of First Office Action for Chinese Application No. 201811162114.0, dated Apr. 20, 2023.
Notification of First Office Action for Chinese Application No. 201811163125.0, dated Apr. 9, 2023.
Notification of First Office Action for Chinese Application No. 201811163530.2, dated Oct. 28, 2023.

* cited by examiner

FIG. 2B

SYSTEMS AND METHODS FOR CONFIGURING AND PRESENTING A DISPLAY NAVIGATION HIERARCHY IN A PROCESS PLANT

CROSS-REFERENCE TO RELATED APPLICATIONS

This application claims priority to and the benefit of the filing date of U.S. Provisional Patent Application No. 62/566,679, filed on Oct. 2, 2017, entitled "Systems And Methods For Graphical Display Configuration and Usage in Process Control Plants," the entire disclosure of which is hereby expressly incorporated by reference herein.

FIELD OF THE DISCLOSURE

This disclosure relates generally to process control systems, and, more particularly, to systems and methods for configuring graphics utilized by operators to view and respond to real-time conditions within and operations of an on-line, industrial process plant.

BACKGROUND

Distributed process control systems are used in chemical, pharmaceutical, petroleum, oil and gas, metals and mining, pulp and paper, or other types of industrial process plants to control one or more industrial processes to thereby generate or produce one or more physical products from raw materials and/or other types of source materials. As such, distributed process control systems typically include one or more process controllers and input/output (I/O) devices communicatively coupled to at least one host or operator interface device and to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more industrial processes executing within the process plant or system. Smart field devices, such as field devices conforming to the well-known Fieldbus protocol may also perform control calculations, alarming functions, and other control functions commonly implemented within a controller. The process controllers, which are also typically located within the plant environment, receive signals indicative of process measurements made by sensors or field devices and/or other information pertaining to the field devices and execute a controller application that runs, for example, different control modules that make process control decisions, generate control signals based on the received information, and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator interfaces, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to view current statuses and operations of processes that are running within the plant, perform functions with respect to controlling a process and/or operating the process plant, such as changing settings of the process control routine, modifying the operation of the control modules within the controllers or the field devices, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson, includes multiple applications stored within and executed by different user interface devices located at diverse places within a process plant, and in some instances, remotely from the process plant. Each of these applications provides a user interface (UI) to allow a user (e.g., a configuration engineer, an operator, a maintenance technician, etc.) to view and/or modify aspects of the process plant operation and configuration. Throughout this specification, the phrase "user interface" or "UI" is used to refer to an application or screen that allows a user to view or modify the configuration, operation, or status of the process plant. Similarly, the phrase "user interface device" or "UI device" is used herein to refer to a device on which a user interface is operating, whether that device is stationary (e.g., a workstation, wall-mounted display, process control device display, etc.) or mobile (e.g., a laptop computer, tablet computer, smartphone, etc.).

A configuration application, which resides in one or more user workstations or computing devices included in a configuration environment of a process plant, enables configuration engineers and/or other types of users to create or change process control modules and download these process control modules via a data highway to dedicated distributed controllers that operate in an operating environment of the process plant (which is also referred to interchangeably herein as an "operations environment" of the process plant) to control one or more processes during runtime or real-time operations. Typically, these control modules are made up of communicatively interconnected function blocks, which perform functions within the control scheme based on inputs thereto and which provide outputs to other function blocks within the control scheme. Each dedicated controller and, in some cases, one or more field devices, stores and executes a respective controller application that runs the control modules assigned and downloaded thereto to implement actual process control functionality.

The configuration application also allows configuration engineers and/or other users to create or change operator Human-Machine Interfaces (HMIs) or display views that are used by an operator viewing application to display data (e.g., as the data is generated in real-time during runtime operations of the process plant) to an operator and to enable the operator to change various settings, such as set points, within the process control routines during runtime operations. The operator viewing applications that provide the operator HMIs or display views are executed on one or more user interface devices (e.g., operator workstations, operator tablets, operator mobile devices, etc.) included in the operations environment of the process plant (or on one or more remote computing devices in communicative connection with the operator workstations and the data highway). The operator HMIs or display views receive data from the controller applications via the data highway and display this data to operators or other users using the UIs at the user interface devices. Similarly, the operator HMIs or display views may also receive data (e.g., real time data) from other control components or elements included in the operating environment of the process plant other than control modules, such as controllers, process controllers, field devices, I/O cards or devices, other types of hardware devices, units, areas, and the like. A data historian application is typically stored in and executed by a data historian device that collects and stores some or all of the data provided across the data highway while a configuration database application may run in a still further computer attached to the data highway to store the current process control routine configuration, the current operator display configuration, and data associated therewith. Alternatively, the configuration database may be located in the same workstation as the configuration application.

As noted above, the operator viewing applications typically execute in one or more of the operator user interface devices and provide operator HMIs or display views to the operator or maintenance persons regarding the operating state of the control system, control components, and/or devices within the plant, e.g., while the plant is operating in real-time or runtime to control one or more industrial processes. Generally speaking, operator HMIs or display views are used by operators in day-to-day operations (which may, for example, be 24/7 operations) of the process running in the process plant to view and respond to real-time conditions within the process and/or the process plant. At least some of these operator HMIs or display views may take the form of, for example, alarming displays that receive alarms generated by controllers or devices within the process plant, control displays indicating the operating state of the controllers and other devices within the process plant, maintenance displays indicating the operating state of the devices within the process plant, etc. Display views typically execute in the runtime or real-time operating environment of the process plant, and are generally configured to present, in known manners, information or data received from process control modules, devices, and/or other control objects that are also operating within the runtime or real-time operating environment of the process plant. In some known systems, display views have a graphical element (e.g., a graphical representation or graphic) that is associated with a physical or logical element included in the operating environment and that is communicatively tied to the physical or logical element to receive data about the physical or logical element and updates thereto over time, e.g., during runtime operations of the process plant. The graphical element may be configured or defined to dynamically change its appearance on the display screen based on the received data to illustrate, for example, that a tank is half full, to illustrate the flow measured by a flow sensor, etc. As such, as the data provided by the physical or logical element in the operating environment of the process plant changes over time (e.g., is repeatedly or continually updated over time), the appearance of the corresponding graphical element is changed on the display screen accordingly.

In some currently-known operator display configuration architectures for industrial process control systems, each operator workstation independently manages its own alarms and access to real-time control data that is generated by process control modules, devices, and/or other control objects. As such, to customize an operator HMI or display view for a particular operator workstation, custom graphical properties, values, and/or configurations of various display view elements (e.g., graphical and other types of elements) that are to be presented on the runtime display view are defined and associated with the display view within a graphical configuration environment, and the definition or configuration of the display view is downloaded from the configuration environment into the particular operator workstation of the operating environment for execution. Often, custom scripts are programmed into the configuration of the display view so that desired behavior and/or appearances of the various display view elements and/or of the display view itself are executed at the particular operator workstation. Additionally, if the display view appearance or behavior is desired to be modified or changed for the particular operator workstation, typically the modifications must be applied to the configuration of the display view in the graphical configuration environment, and then the modified configuration must be downloaded from the configuration environment for execution at the particular operator workstation. In most cases, this requires that the particular operator workstation cease its execution of the current display view in order for the modified display view configuration to be received and executed at the particular operator workstation.

In other currently-known operator display configuration architectures for industrial process control systems, a common configuration for a display view is downloaded from the graphical configuration environment to multiple operator workstations. To effect particular, customized appearances and/or behaviors of the display view at a particular operator workstation, though, during runtime the particular operator workstation at which the display view is executing must query or otherwise communicate with the graphical configuration environment to obtain necessary information (such as particular configurations of various graphics, runtime values, and/or other information) to effect or implement the desired customized appearances and/or behaviors of the display view at the particular operator workstation. As modern-day process plants may include hundreds of operator workstations, the messages that are sent and received between operator workstations and back-end display configuration servers add a significant load to process plant communication networks.

Recently, the Center for Operator Performance (COP), a research consortium that addresses human capabilities and limitations in industrial process control operating environments through research, collaboration, and human factors engineering, and the International Society of Automation (ISA) have been working to help advance industrial process control system Human Machine Interfaces (HMIs) and their ease of use, for example, by suggesting improvements and guidelines in Human Centered Design (HCD). For example, the American National Standard ANSI/ISA-101.01.-2015 entitled "Human Machine Interfaces for Process Automation Systems" and approved on Jul. 9, 2015 addresses "the philosophy, design, implementation, operation, and maintenance of Human Machine Interfaces (HMIs) for process automated systems including multiple work processes throughout the HMI lifecycle . . . [t]he standard defines the terminology and models to develop and HMI in the work processes recommended to effectively maintain the HMI throughout the lifecycle" (ANSI/ISA-101.01-2015, page 9).

SUMMARY

As discussed above, generally speaking, operator Human-Machine Interfaces (HMIs) or display views are used by operators during the runtime operations of the process to view and respond to conditions within the process and/or process plant. The effectiveness of process plant operators in operating the process safely and effectively, as well as in detecting and responding to various process and process plant conditions depends, in a large part, on how well the operator HMIs or display views are designed (e.g., by the configuration engineers or other operator HMI designers). However, recent changes in how industrial process plants are operated greatly affect the design of operator HMIs. For example, continued competitive pressure in process control industries has led to a significant expansion in the span of a portion of the process for which a single operator is responsible. With this expansion, the number of process graphics that the single operator must monitor and utilize to safely and efficiently run the process has increased several-fold. In fact, in a present day process plant, operators are commonly expected to navigate through hundreds of process graphics. In addition, trends such as increasing intelligence in plant equipment and more automated and advanced control logic in process control industries have led to a significant increase in the level of complexity of the portion of the process for which a single operator is responsible.

Further, the work space that is utilized by a single operator may include one to many consoles or monitors in a variety of sizes. The number and sizes of monitors and/or consoles are often determined by the size and complexity of the portion of the process being monitored by the operator. Additionally, when an operator's work space includes multiple monitors, each monitor typically has a custom layout defined for each monitor's respective monitor size, location, and portion of the process being monitored. For example, the custom layout defines what displays should open on which monitor, how displays on different monitors interact with each other, etc.

Still further, as no two process plants or operating sections within a plant are alike, in practice each process plant often develops and designs its own, custom operational philosophies, graphics, and/or graphical standards for effective operation. Accordingly, the operator HMI graphics, strategies, design, layout, navigation, and/or operator actions may be, to a significant extent, custom built for different operating sections and/or different process plants.

These and other factors have made the configuration engineer's job of designing operating HMIs ever more difficult. Often, configuration engineers must create complex, programmatic extensions to operator HMIs to customize or hone various capabilities for particular operating sections and/or plants. Commonly, configuration engineers must utilize programming languages like Visual Basic or C, and/or other custom programs to create the desired operator HMI. This results in a complex operator HMI suite that is difficult and time consuming to develop, extend, troubleshoot, and maintain.

At least some of the aspects of the novel graphical display configuration and usage systems and methods disclosed herein address these and other modern-day HMI challenges, as well as provide a platform for industrial process control HMI design and use that is not only flexible, easy to use, and easy to maintain, but also helps engineers design and implement their process plant's operating environment HMI in light of current process automation HMI standards and best practices.

In an embodiment, a graphical display configuration and usage system for an industrial process plant (also interchangeably referred to herein as a "graphical configuration system" or a "graphical configuration and usage system") includes a graphical display configuration application that executes in a configuration environment of the process plant. The graphical display configuration application includes a user interface via which various operator HMIs or display views are able to be created, defined, designed, and/or published, e.g., by a configuration engineer. A configured or defined display view, when downloaded into and executing in the operating or operations environment of the process plant, provides an operator or other user with real-time (e.g., continually or repeatedly updated) operating states and statuses of various components and operations associated with the process. As such, a display view typically includes respective links between one or more display view elements presented on the display view and one or more control modules, devices, or control objects that are executing to control the process within the operating environment of the process plant so that, upon download and execution of a published configuration of the display view at a user interface device that is communicatively connected to an operating environment of the process plant (e.g., at an operator workstation, remote computing device, mobile device, etc.), respective indications of one or more values or other data that are provided or generated by the one or more control modules, devices, or control objects while executing in the operating environment of the process plant are presented and repeatedly updated on the executing display view, e.g., via the linked display view elements.

The graphical display configuration system also includes a centralized configuration database or library that stores published configurations or definitions of display views as well as published configurations or definitions of display view elements that are available to be included on or otherwise associated with various display views. In some embodiments, the centralized configuration database or library also stores draft configurations or definitions of display views and/or display view elements. Examples of display view elements include graphics, properties, links to control modules, devices, objects, and/or other control components or elements that are disposed in the operating environment, global variables, parameters, areas or subsections of the display view, and/or other elements and/or portions of the display view. In an example, for a particular display view, the centralized configuration database or library stores a published configuration of the particular display view and optionally one or more working or draft configurations of the particular display view. The published configuration of the particular display view may include one or more published configurations of various display view elements that are to appear on the executing display view, and the published display view configuration is available for download and execution in the operating environment of the process plant. On the other hand, the one or more working or draft configurations of the particular display view are excluded from download and execution in the operating environment of the process plant. That is, working or draft configurations of display views and of display view elements are prevented from being downloaded and executed in the operating environment of the process, and instead are maintained within the configuration environment, e.g., for edit, modification, testing, etc.

The published configuration or definition of the particular display view includes one or more user controls via which an operator or user of the user interface device included in the operating environment of the process plant is able to change an appearance of the executing display view at his or her respective user interface device on-line during runtime operations. For example, the operator, via the one or more user controls at his or her respective user interface device, is able to change the appearance of a graphic, a property of a graphic, an area of the display view, a property and/or content of the area of a display view, a location of a graphic on the display view, particular data sourced by a control module, device, or control object that is to be displayed, and/or other appearances of elements, areas, or portions of the executing display view. Significantly, the graphics configuration system allows the change to the appearance of the executing display view in the operating environment to be implemented at the operator workstation solely based upon contents of the published configuration or definition of the display view that is executing at the operator workstation. That is, the downloaded, published configuration of the display view allows the operator to customize or change the appearance of the display view at the operator's workstation while the display view is executing on-line in the operating environment without having to halt the execution of the display view, without having to download a different configuration of the display view, and without the display view and/or the operator workstation needing to obtain data from the configuration environment to implement the desired change.

Accordingly, when the published configuration or definition of the particular display view is downloaded to multiple user interface devices or operator workstations included in the operating environment of the process plant, each operator or user is able to customize or change the local appearance of the instance of the display view that is executing at his or her workstation independently of other operators or users, and without his or her workstation communicating with the graphical display configuration application and configuration library. Some of the operator-initiated changes or customizations may be implemented in a mutually exclusive manner at a particular workstation, for example, a fill property of a graphic is selected by the operator to be either gray or blue, but not both gray and blue. Some of the changes may not be mutually exclusive at a particular workstation (e.g., the changes may be cumulative or independently applied), such as when the operator drags and drops graphics that are indicative of particular control elements that the operator desires to actively (and easily) monitor into an Active Monitor or Watch window included on the display view.

In an embodiment, a method for configuring graphical displays for runtime or real-time operations of a process plant includes receiving, via a user interface of a graphical display configuration application executing in a configuration environment of a process plant, a definition of a display view. The display view typically includes various graphical elements that are representative of respective control modules, devices, and/or other control components (also referred to interchangeably herein as control elements or control objects) that execute or operate in the operating environment of the process plant, e.g., to control at least a portion of the process, such as controllers, process controllers, field devices, I/O cards or devices, other types of hardware devices, units, areas, etc. Accordingly, the definition of the display view defines a link between a graphical element presented on the display view and a control component or object so that, upon download and execution of the display view in the operating environment of the process plant, one or more values or other data that are generated by the control component or control object while executing in the operating environment of the process plant to control the process are presented and repeatedly updated on the executing display view via the linked graphical element. The graphical element may be, for example, a graphic that is indicative or representative of a particular control module, device, or other control component or object.

Additionally, typically the definition of the display view includes respective definitions of various other graphical portions, elements, or components (and/or combinations thereof) that are included on and/or otherwise associated with the display view, such as graphics, text, properties of graphics and/or text (e.g., color, contrast, animations, etc.), global variables, parameters, different areas of the display view, respective properties and/or content of different areas of the display view, different locations of various graphics, text, and/or areas on the display view, and/or particular operating data that is sourced by control modules, devices, and/or other control objects and their linkages to respective graphics or other elements on the display view, to name a few. Other such graphical portions, elements, and/or components which may be included on and/or otherwise associated with the display view may include, for example, display view hierarchies, display view layouts, timers, embedded links, animation conversion functions, data references, project or plant standards, display themes, content languages and/or indications thereof, application languages and/or indications thereof, tab areas on display views, tooltips and/or other contextual displays, trends and other representations of historized parameters, watch or active monitoring areas, and/or other features, aspects, and/or functionalities provided by the present graphical configuration and usage systems and methods described herein. Still other graphical portions, elements, and/or components which may be included on and/or otherwise associated with the display view may include custom and/or default Graphic Element Module (GEM) configurations (e.g., such as described in co-owned U.S. patent application Ser. No. 15/692,450 filed on Aug. 31, 2017 and entitled "Derived and Linked Definitions with Override," and/or may include operator display switching preview configurations and/or objects associated therewith (e.g., such as described in co-owned U.S. patent application Ser. No. 15/243,176 filed on Aug. 22, 2016 and entitled "Operator Display Switching Preview."

At any rate, for ease of reading herein, such graphical portions, elements, or components (and combinations thereof) that are included on or otherwise associated with a display view are generally referred to interchangeably herein as "graphical display view elements," "graphical elements," "graphical components," "display view elements," "display elements," or "display view components." Typically, each display view element may be defined by or configured using its own separate object, where the object may be created, modified, stored, and published via the graphical configuration and usage systems and methods described herein.

Some of the definitions of display view elements may define mutually exclusive options, for example, the color theme of the display view in its entirety may be selectively changed by the operator between various defined color themes, or the language that is used on the display view is switched by the operator between Arabic and French. Some of the definitions of display view elements may not be mutually exclusive, such as when the operator drags and drops graphics that are indicative of particular control elements that the operator desires to actively (and easily) monitor into an Active Monitor or Watch window included on the display view.

With particular regard to a display view configuration or definition that defines a plurality of properties that are selectable in the operating environment in a mutually exclusive manner for application to a particular portion of the executing display view, the method includes receiving, via the user interface of the graphical display configuration application, an indication of a selection of a subset of a plurality of user interface devices (e.g., operator workstations) that are included in the operating environment of the process plant and to which respective instances of the display view definition are to be downloaded for execution. The selected subset of user interface devices may include more than one user interface device, if desired. The method further includes downloading the definition of the display view (which may be a published definition) into each user interface device included in the selected subset of user interface devices for execution in the operating environment of the process plant, thereby enabling the particular portion of the executing display view to be selectively changed, in the mutually exclusive manner between the plurality of properties, independently at each user interface device. Accordingly, each user interface device implements its respective change solely based upon the contents of the downloaded definition of the display view executing at the user interface device, and without communicating with any other device included in the configuration environment of the process plant to effect or implement the change. Thus, a first operator may select "flashing" for a particular property of a particular graphic included on the display view at his or her workstation, while another operator may select "no flashing" for the particular property of the particular graphic included on the display view at his or her workstation. Both selections are fully supported and solely implemented by the respective downloaded definitions of the display view executing at the workstations without having to halt execution of the display view at the workstations, without having to download a different configuration of the display view to the workstations, and without the display views and/or the operator workstations obtaining data or other information from the configuration environment to implement the desired change.

It is noted that while the disclosure herein refers to graphical display views and graphical display view elements, this is for illustrative and ease of discussion purposes only, and is not meant to be limiting. Indeed, any one or more of the aspects discussed herein with respect to graphical display views may easily be applied to Graphical Element Module (GEM) classes, for example. Similarly, any one or more of the aspects discussed herein with respect to graphical display view elements may be easily applied to GEMs, for example. As is commonly known, GEMs are linked graphical configurable shapes that are reusable and that may be combined with other shapes and/or behaviors. Typically, GEMs provide one or more visual representations or views of a configurable shape, and the definition or configuration of a GEM is stored separately from definitions or configurations of usage/instances of that GEM in specific display views and other objects (e.g., to enable sharing the GEM definition/configuration). As such, the graphical configuration systems and methods described herein and any one or more aspects thereof may be easily applied to GEMs and GEM classes.

BRIEF DESCRIPTION OF THE DRAWINGS

FIG. 2B is a block diagram of an example implementation of the graphical configuration library included in the graphical configuration and usage of system of FIG. 2A;

DETAILED DESCRIPTION

Figure 1A:
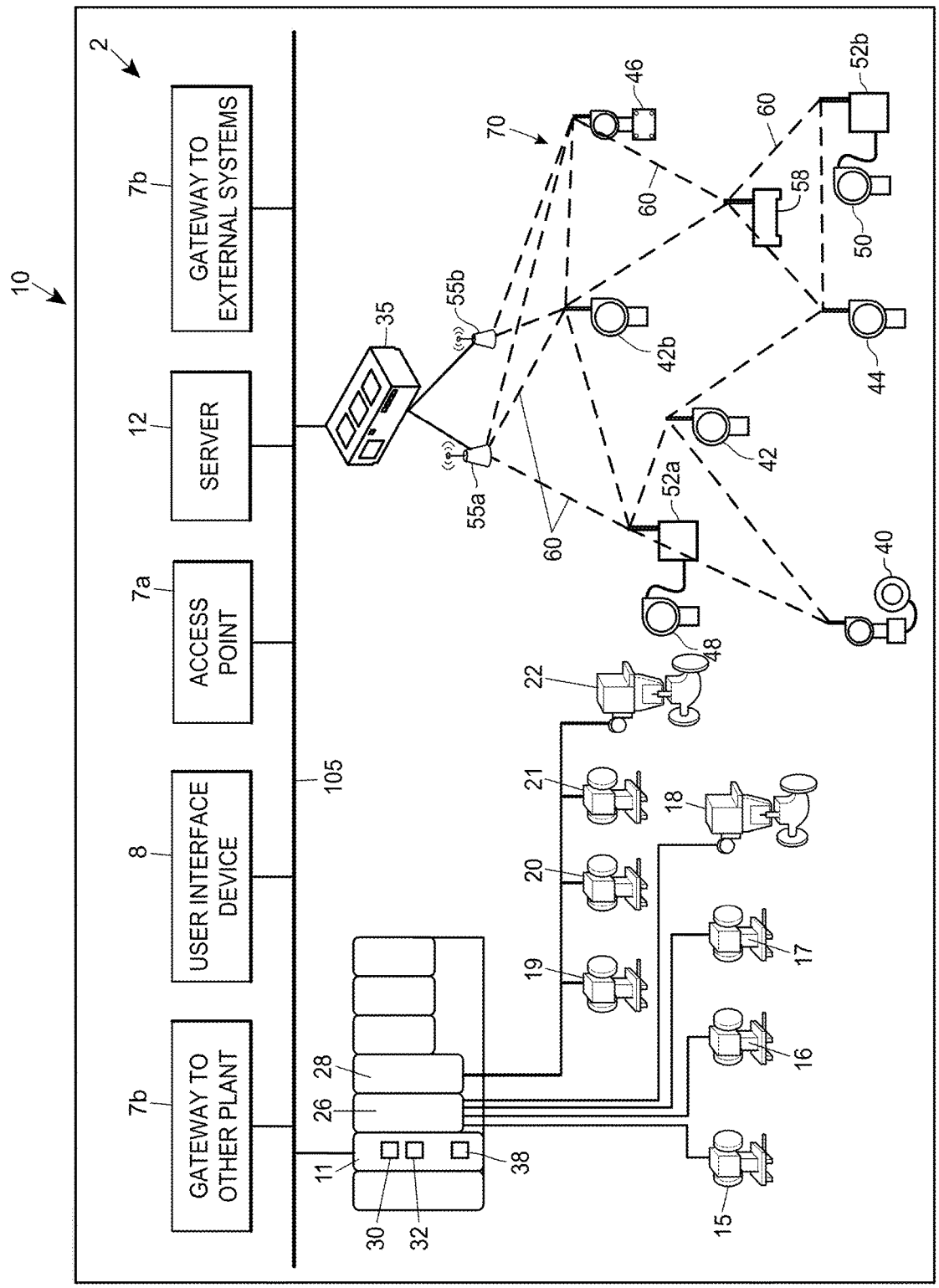
FIG. 1A is a block diagram of a distributed process control network located within a process plant including the graphics configuration and usage systems and methods of the present disclosure.

FIG. 1A is a block diagram of an exemplary process control network or system 2 operating in a process control system or process plant 10 with and/or in which embodiments of the novel graphical display configuration and usage system described herein may be utilized. The process control network or system 2 may include a network backbone 5 providing connectivity directly or indirectly between a variety of other devices. The devices coupled to the network backbone 5 include, in various embodiments, combinations of one or more access points 7*a*, one or more gateways 7*b* to other process plants (e.g., via an intranet or corporate wide area network), one or more gateways 7*c* to external systems (e.g., to the Internet), one or more user interface (UI) devices 8 which may be stationary (e.g., a traditional operator workstation) or mobile computing devices (e.g., a mobile device smart-phone), one or more servers 12 (e.g., which may be implemented as a bank of servers, as a cloud computing system, or another suitable configuration), controllers 11, input/output (I/O) cards 26 and 28, wired field devices 15-22, wireless gateways 35, and wireless communication networks 70. The communication networks 70 may include wireless devices 40-58, which include wireless field devices 40-46, wireless adapters 52a and 52b, access points 55a and 55b, and a router 58. The wireless adapters 52a and 52b may be connected to non-wireless field devices 48 and 50, respectively. The controller 11 may include a processor 30, a memory 32, and one or more control routines 38. Though FIG. 1A depicts only a single one of some of the devices that are directly and/or communicatively connected to the network backbone 5, it will be understood that each of the devices could have multiple instances on the network backbone 5 and, in fact, that the process plant 10 may include multiple network backbones 5.

The UI devices 8 may be communicatively connected to the controller 11 and the wireless gateway 35 via the network backbone 5. The controller 11 may be communicatively connected to wired field devices 15-22 via input/output (I/O) cards 26 and 28 and may be communicatively connected to wireless field devices 40-46 via the network backbone 5 and a wireless gateway 35. The controller 11 may operate to implement a batch process or a continuous process using at least some of the field devices 15-22 and 40-50. The controller 11, which may be, by way of example, the DeltaV™ controller sold by Emerson, is communicatively connected to the process control network backbone 5. The controller 11 may be also communicatively connected to the field devices 15-22 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-22, 48, 50 and the I/O cards 26, 28 are wired devices, and the field devices 40-46 are wireless field devices.

In operation of the UI device 8, the UI device 8 may, in some embodiments, execute a user interface ("UI"), allowing the UI device 8 to accept input via an input interface and provide output at a display. The UI device 8 may receive data (e.g., process related data such as process parameters, log data, sensor data, and/or any other data that may be captured and stored), from the server 12. In other embodiments, the UI may be executed, in whole or in part, at the server 12, where the server 12 may transmit display data to the UI device 8. The UI device 8 may receive UI data (which may include display data and process parameter data) via the backbone 5 from other nodes in the process control network or system 2, such as the controller 11, the wireless gateway 35, and/or the server 12. Based on the UI data received at the UI device 8, the UI device 8 provides output (i.e., visual representations or graphics, some of which may be updated during run-time) representing aspects of the process associated with the process control network or system 2, allowing the user to monitor the process. The user may also affect control of the process by providing input at the UI device 8. To illustrate, the UI device 8 may provide graphics representing, for example, a tank filling process. In such a scenario, the user may read a tank level measurement and decide that the tank needs to be filled. The user may interact with an inlet valve graphic displayed at the UI device 8 and input a command causing the inlet valve to open.

In certain embodiments, the UI device 8 may implement any type of client, such as a thin client, web client, or thick client. For example, the UI device 8 may depend on other nodes, computers, UI devices, or servers for the bulk of the processing necessary for operation of the UI device 8, as might be the case if the UI device is limited in memory, battery power, etc. (e.g., in a wearable device). In such an example, the UI device 8 may communicate with the server 12 or with another UI device, where the server 12 or other UI device may communicate with one or more other nodes (e.g., servers) on the process control network or system 2 and may determine the display data and/or process data to transmit to the UI device 8. Furthermore, the UI device 8 may pass any data related to received user input to the server 12 so that the server 12 may process the data related to user input and operate accordingly. In other words, the UI device 8 may do little more than render graphics and act as a portal to one or more nodes or servers that store the data and execute the routines necessary for operation of the UI device 8. A thin client UI device offers the advantage of minimal hardware requirements for the UI device 8.

In other embodiments, the UI device 8 may be a web client. In such an embodiment, a user of the UI device 8 may interact with the process control system via a browser at the UI device 8. The browser enables the user to access data and resources at another node or server 12 (such as the server 12) via the backbone 5. For example, the browser may receive UI data, such as display data or process parameter data, from the server 12, allowing the browser to depict graphics for controlling and/or monitoring some or all of the process. The browser may also receive user input (such as a mouse click on a graphic). The user input may cause the browser to retrieve or access an information resource stored on the server 12. For example, the mouse click may cause the browser to retrieve (from the server 12) and display information pertaining to the clicked graphic.

In yet other embodiments, the bulk of the processing for the UI device 8 may take place at the UI device 8. For example, the UI device 8 may execute the previously discussed UI. The UI device 8 may also store, access, and analyze data locally.

In operation, a user may interact with the UI device 8 to monitor or control one or more devices in the process control network or system 2, such as any of the field devices 15-22 or the devices 40-50. The user may interact with the UI device 8, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-50 and with other nodes that are communicatively connected to the backbone 5. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be defined and implemented by a user through the UI device 8. The control routines may be stored in any desired type of memory, such as random access memory (RAM), or read only memory (ROM) of the controller 11. Likewise, the control routines may be hard-coded into, for example, one or more EPROMs, EEPROMs, application specific integrated circuits (ASICs), or any other hardware or firmware elements of the controller 11. Thus, the controller 11 may be configured (by a user using a UI device 8 in certain embodiments) to implement (e.g., receive, store, and/or execute) a control strategy or control routine in any desired manner.

In some embodiments of the UI device 8, a user may interact with the UI device 8 to define and implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 8, allowing a user to easily modify the types of function blocks, the connections between the function blocks, and the inputs/outputs associated with each of function blocks implemented in the process control system. Function blocks may be downloaded to, stored in, and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Referring still to FIG. 1A, the wireless field devices 40-46 communicate in a wireless network 70 using a wireless protocol, such as the Wireless HART protocol. In certain embodiments, the UI device 8 may be capable of communicating with the wireless field devices 40-46 using the wireless network 70. Such wireless field devices 40-46 may directly communicate with one or more other nodes of the process control network or system 2 that are also configured to communicate wirelessly (using the wireless protocol, for example). To communicate with one or more other nodes that are not configured to communicate wirelessly, the wireless field devices 40-46 may utilize a wireless gateway 35 connected to the backbone 5. Of course, the field devices 15-22 and 40-46 could conform to any other desired standard(s) or protocols, such as any wired or wireless protocols, including any standards or protocols developed in the future.

The wireless gateway 35 may provide access to various wireless devices or nodes 40-46, 52-58 of a wireless communication network 70. In particular, the wireless gateway 35 provides communicative coupling between the wireless devices 40-46, 52-58 and other nodes of the process control network or system 2 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks, in an example implementation. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices 48, 50, which may be wired devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a respective wireless adaptor (WA) 52*a*, 52*b*. Additionally, the wireless adaptors 52*a*, 52*b* may support other communication protocols such as Foundation® Fieldbus, PROFIBUS, DeviceNet, etc. Furthermore, the wireless network 70 may include one or more network access points 55*a*, 55*b*, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 40-46 and 52-58 may communicate with each other and with the wireless gateway 35 over wireless links 60 of the wireless communication network 70.

In certain embodiments, the process control network or system 2 may include other nodes connected to the network backbone 5 that communicate using other wireless protocols. For example, the process control network or system 2 may include one or more wireless access points 7*a* that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, and/or other wireless communication protocols. Typically, such wireless access points 7*a* allow handheld or other portable computing devices to communicate over a respective wireless network that is different from the wireless network 70 and that supports a different wireless protocol than the wireless network 70. In some embodiments, the UI device 8 communicates over the process control network or system 2 using a wireless access point 7*a*. In some scenarios, in addition to portable computing devices, one or more process control devices (e.g., controller 11, field devices 15-22, or wireless devices 35, 40-46, 52-58) may also communicate using the wireless network supported by the access points 7*a*.

Additionally or alternatively, the process control network or system 2 may include one or more gateways 7*b*, 7*c* to systems that are external to the immediate process control system. In such embodiments, the UI device 8 may be used to control, monitor, or otherwise communicate with said external systems. Typically, such systems are customers and/or suppliers of information generated or operated on by the process control system. For example, a plant gateway node 7*b* may communicatively connect the immediate process plant 10 (having its own respective process control data network backbone 5) with another process plant having its own respective network backbone. In an embodiment, a single network backbone 5 may service multiple process plants or process control environments.

In another example, the plant gateway node 7b may communicatively connect the immediate process plant to a legacy or prior art process plant that does not include a process control network or system 2 or backbone 5. In this example, the plant gateway node 7b may convert or translate messages between a protocol utilized by the process control big data backbone 5 of the plant 10 and a different protocol utilized by the legacy system (e.g., Ethernet, Profibus, Fieldbus, DeviceNet, etc.). In such an example, the UI device 8 may be used to control, monitor, or otherwise communicate with systems or networks in said legacy or prior art process plant.

The process control network or system 2 may include one or more external system gateway nodes 7c to communicatively connect the process control network or system 2 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, and/or other external systems. The external system gateway nodes 7c may, for example, facilitate communication between the process control system and personnel outside of the process plant (e.g., personnel at home).

Although FIG. 1A illustrates a single controller 11 with a finite number of field devices 15-22, 40-46, and 48-50 communicatively connected thereto, this is only an illustrative and a non-limiting embodiment. Any number of controllers 11 may be included in the process control network or system 2, and any of the controllers 11 may communicate with any number of wired or wireless field devices 15-22, 40-50 to control a process in the plant 10. Furthermore, the process plant 10 may also include any number of wireless gateways 35, routers 58, access points 55, wireless process control communication networks 70, access points 7a, and/or gateways 7b, 7c.

Figure 1B:
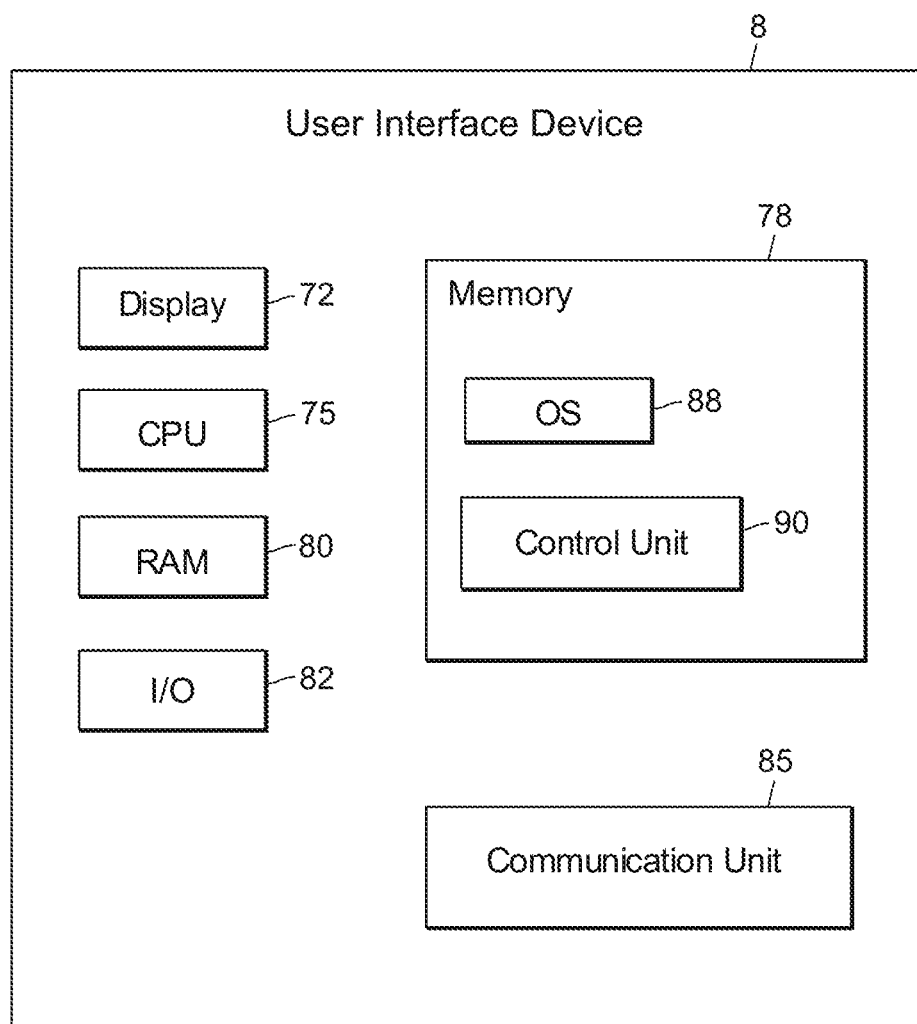
FIG. 1B is a block diagram of an example user interface device schematically illustrated in FIG. 1A.

FIG. 1B illustrates a block diagram of an example UI device 8 which may be utilized in conjunction with embodiments of the novel graphical display configuration and usage system described herein. The UI device 8 may be a desktop computer such as a traditional operator workstation, a control room display, or a mobile computing device such as a laptop computer, a tablet computer, a mobile device smartphone, a personal digital assistant (PDA), a wearable computing device, or any other suitable client computing device. The UI device 8 may execute a graphical display configuration application utilized by a configuration engineer in the configuration environment to create, generate, and/or edit various display view definitions or configurations as well as create, generate, and/or edit various display view element definitions or configurations. The UI device 8 may also execute an operator application utilized by an operator to monitor, observe, and react to various statuses and conditions of the process within the operating environment. The UI device 8 may include a display 72. Further, the UI device 8 includes one or more processors or CPUs 75, a memory 78, a random-access memory (RAM) 80, an input/output (I/O) circuit 82, and a communication unit 85 to transmit and receive data via a local area network, wide area network, and/or any other suitable network, which may be wired and/or wireless. The UI device 8 may communicate with the controllers 11, the server 12, and/or any other suitable computing device.

The memory 78 may include an operating system 88, applications running on the operating system 88 such as the graphical display configuration application and operator application, and a control unit 90 for controlling the display 72 and communicating with the controllers 11 to control on-line operation of the process plant. In some embodiments, the server 12 may transmit a graphical representation of a portion of the process plant to the UI device 8 and in turn, the control unit 90 may cause the graphical representation of the portion of the process plant to be presented on the display 72. Additionally, the control unit 90 may obtain user input from the I/O circuit 82, such as user input from the operator or configuration engineer (also referred to herein as a user) and translate the user input into a request to present a graphical display view in a particular language, a request to include graphics that are indicative of particular control elements in an Active Monitor or Watch window included on the display view, a request to display an adjustment to a process parameter included in one of the process sections, etc.

In some embodiments, the control unit 90 may communicate the translated user input to the server 12 which may generate and transmit the requested UI to the UI device 8 for display. In other embodiments, the control unit 90 may generate the new UI based on the translated user input and present the new UI on the display 72 of the UI device 8. When the translated user input is a request to display an adjustment to a process parameter included in one of the process sections, the control unit 90 may adjust the process parameter value on the display 72 in accordance with the user input from the operator and may provide instructions to the controllers 11 to adjust the process parameter in the process plant. In other embodiments, the control unit 90 may communicate the translated user input to the server 12 which may generate and transmit the adjusted process parameter value to the UI device 8 for display, and provide instructions to the controllers 11 to adjust the process parameter in the process plant.

Figure 2A:
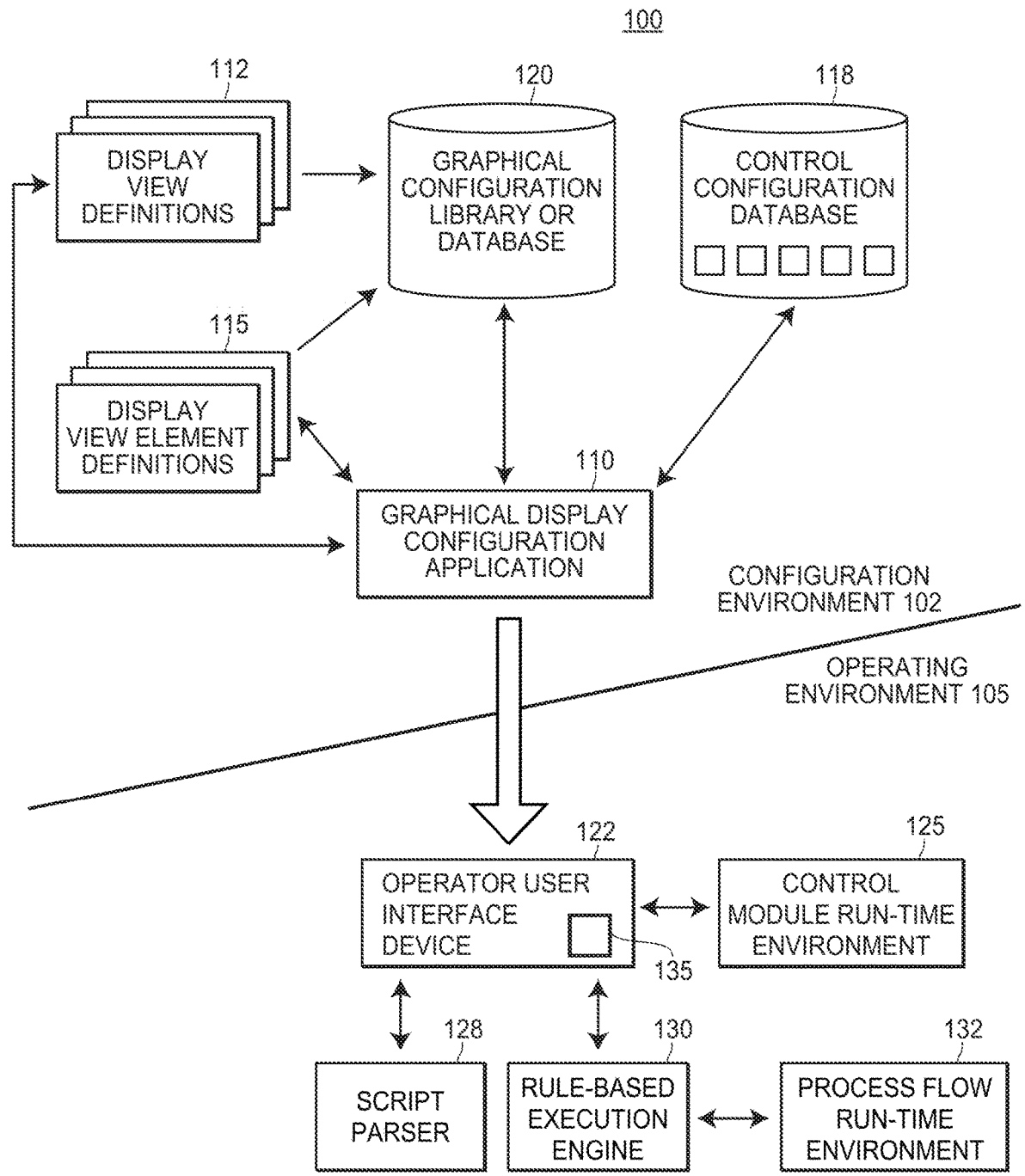
FIG. 2A is a block diagram of an example implementation of a graphical display configuration and usage system in a configuration environment and in an operating environment of a process plant, such as the process plant of FIG. 1A.

FIG. 2A depicts a high-level block diagram illustrating one possible manner of implementing embodiments and/or aspects of the graphical display configuration and usage system 100 described herein within a configuration environment 102 and an operating or operations environment 105 of a process plant or process control system, e.g., of the process plant 10 of FIG. 1A. The configuration environment 102 of the process control system is interchangeably referred to herein as the "off-line" environment 102 or the "back-end" environment 102 of the process control system, and the operating environment 105 of the process control system is interchangeably referred to herein as the "operations," "on-line," "front-end," or "field" environment 105 of the process control system.

As illustrated in FIG. 2A, the configuration environment 102 includes a graphical display configuration application 110 that includes a user interface via which a configuration engineer or user may create, generate, and/or edit various display view definitions or configurations 112 as well as create, generate, and/or edit various display view element definitions or configurations 115. For example, the graphical display configuration application 110 may execute on an instance of the user device 8 of FIGS. 1A and/or 1B. Each display view configuration 112 and each display view element configuration 115 may be implemented as a respective object, for example. Generally speaking, a display view definition 112 may be configured to include (among other components) one or more display element definitions 115. Typically, a display view definition 112 is configured to include at least one display element (e.g., a graphical element) that is linked to a particular control module, device, or other type of control object so that in the operating environment 105, runtime data associated with the particular control module, device, or control object may be represented via the linked display element(s) on the executing display view, e.g., in a continually or repeatedly updated manner. The particular control module, device, or control object typically is defined in a control configuration database 118 (e.g., its configuration is stored in the control configuration database 118), and may be represented within the display view definition 112 by a designated control tag or other suitable indicator, for example. As shown in FIG. 2A, the display view-related definitions or configurations 112, 115 are stored in a centralized graphical configuration database or library 120 so that the graphical display-related configurations 112, 115 are available for download and execution in the operating environment 105 to thereby allow operators or users to monitor, observe, and react to various statuses and conditions of the process within the operating environment 105. It is noted that although the graphical configuration database 120 and the control configuration database 118 are illustrated in FIG. 2A as being separate databases within the configuration environment 102 of the process control system 10, in some implementations, at least portions or the entireties of the configuration databases 120, 118 may be integrally implemented as a unitary database or library.

At any rate, in FIG. 2A, a display view configuration 112 may be defined to specify one or more control objects 118 that are associated with or bound to respective display view elements 115 included on the display view 112, and then the definitions of the display view elements 115 and the control objects 118 respectively bound thereto are instantiated and provided to (e.g., are downloaded into) one or more different operator workstations or user interface devices 122 included in the operating environment 105 of the process plant 10. In an example, the user interface device or workstation 122 may take the form of the user interface device 8 of FIG. 1B. The instantiated display view 112 executing at the user interface device 122 communicates with the control module runtime environment 125, which may be executed in controllers and field devices associated with the process, to access or otherwise obtain data or other information from the control module runtime environment 125, e.g., as defined by the bound control objects 118 of the display view 112. The user interface device 122 may communicate with the control module runtime environment 125 using any desired or preconfigured communication networks, such as the data highway 5 and/or the wireless communication networks 70 of FIG. 1A.

In some embodiments, user interface device 122 uses a download script parser 128 to parse at least some of the downloaded display view configuration 112 during its execution (e.g., to perform just in time object code conversion), although use of the download script parser 128 by the user interface device 122 is not necessary or required, e.g., when a downloaded display view configuration 112 does not include any scripts.

In some embodiments, the user interface device 122 uses a rule-based execution engine 130 to execute process flow algorithms or other rule based procedures (e.g., as provided by a process flow runtime environment 132) that are indicated by or bound to the display view element objects 115 and/or to the display view object 112, such as when one or more of the display view element objects 115 is a smart process object. Generally speaking, a smart process object is defined or configured to include data storage for storing data pertaining to and received from other entities within the process plant 10, as well as inputs and outputs for communicating with other smart process objects and methods that may be executed on the stored and received data, e.g., to detect plant or device conditions. In some arrangements, smart process objects are communicatively connected together to create a process flow module that provides a display view for, and implement a set of rules for a plant entity, such as an area, device, element, module, etc., and the process flow module is executed in the runtime by the process flow runtime environment 132, e.g., by using the execution engine 130. It is noted that the use of the execution engine 130 by the user interface device 122 is not necessary or required, e.g., when a downloaded display view configuration 112 does not include any smart process objects. It is further noted that other methods of integrating the display views and display view elements with runtime control objects in the operating environment 105 other than those discussed herein are additionally or alternatively possible, and may be utilized by the graphical display configuration and usage system 100. For ease of discussion, an instantiated display view that executes or is provided on a user interface device 122 of the operating environment 105 is generally referred to herein as an operator or operations application 135.

Figure 2B:
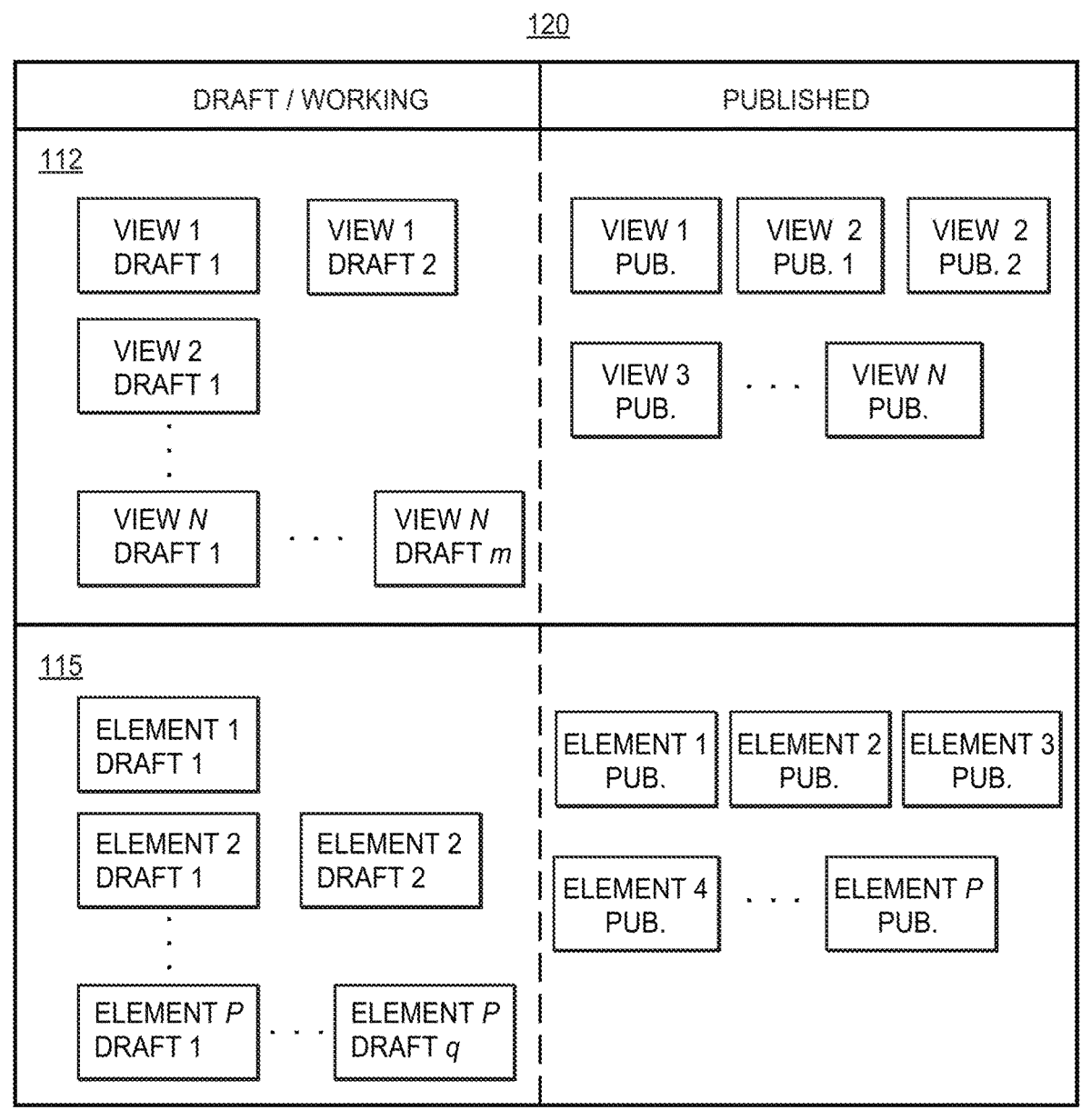

FIG. 2B depicts a detailed block diagram of an embodiment of the graphical configuration library 120 included in the graphical display configuration and usage system 100 of FIG. 2A. As illustrated in FIG. 2B, the graphical configuration library 120 stores both display view definitions or configurations 112 as well as display view element definitions or configurations 115. Each definition or configuration 112, 115 may have associated therewith a published version and optionally one or more draft versions (which are also referred to herein interchangeably as "in-progress" or "working" versions) which are stored in the library 120. As shown in FIG. 2B, View 1 has two corresponding draft configurations and one corresponding published configuration stored in the graphical configuration database 120. Additionally, the graphical configuration database 120 is shown as storing one draft configuration and two published configurations for View2, one published configuration and no draft configurations for View3, and m draft configurations and one published configuration for ViewN. Generally speaking, only published configurations or definitions are allowed or permitted to be downloaded from the graphical configuration library 120 or elsewhere within the configuration environment 102 into the operating environment 105. Draft configurations or definitions may be maintained, stored, and edited solely within the configuration environment 102, in some embodiments. If draft configurations or definitions are stored within the configuration environment 102, the drafts are prevented from being downloaded into the operating environment 105. When a configuration engineer is satisfied with a draft display-related configuration or definition 112, 115, the engineer may explicitly publish the display-related configuration or definition 112, 115 (e.g., change its state to "published") so that it is available for download and execution in the runtime process plant 10. In some embodiments, a single user control may implement both the publishing and the subsequent download of the publication. In other embodiments, a publish user control or command and a download user control or command are different and distinct user controls provided by the configuration application 110.

As such, multiple configuration engineers are able to create, modify, and test graphical configurations and definitions (and in some situations, simultaneously) without impacting runtime operations of the subject configurations, e.g., as illustrated by the m draft configurations of ViewN and the published configuration of the ViewN. Additionally, different versions of a same display view may be published and available for runtime operations, for example, when a same display view is configured to have different combinations of operator customizations that are downloaded to different areas of the plant, e.g., as illustrated by the two publications of View2. (Of course, the graphical display configuration system 100 allows configuration engineers to re-name different publications of View2 as separate views instead of different publications of the same view, if so desired.) In some embodiments, at least some of the published display views and published display view elements are available out-of-the-box, that is, at least some published display views and published display view elements are provided as defaults in the library 120. Such default views and elements may be edited or modified by configuration engineers using the graphical display configuration application 110, and the modified views or elements may be published as additional or alternative published versions of the default objects 112, 115.

A particular display view configuration may be defined, e.g., by configuration engineers or users via the graphical display configuration application 110, to include (e.g., refer to, point to, or reference) one or more display view element configurations, among other components. Similarly, in some instances, a particular display view element configuration may be defined to include (e.g., refer to, point to, or reference) one or more other display view elements. Significantly, various display-related configurations or definitions (whether of display views and/or of display view elements) may respectively define a set of operator-selectable customizations that are made available for the operator to modify the appearance of the corresponding display view or display view element during runtime as the operator desires, without having to create and/or download a revised configuration, and without the display view, the display view element, or the user interface device on which the display view is executing having to obtain additional configuration data indicative of the modification from another computing device (e.g., from a computing device or database included in the configuration environment 102, or from a computing device or database included in the operating environment 102 that locally stores configuration data or copies thereof). Additionally, in some embodiments, the particular display view configuration may also include one or more global variables or scripts in addition to the other display view elements referenced therein.

Figure 2C:
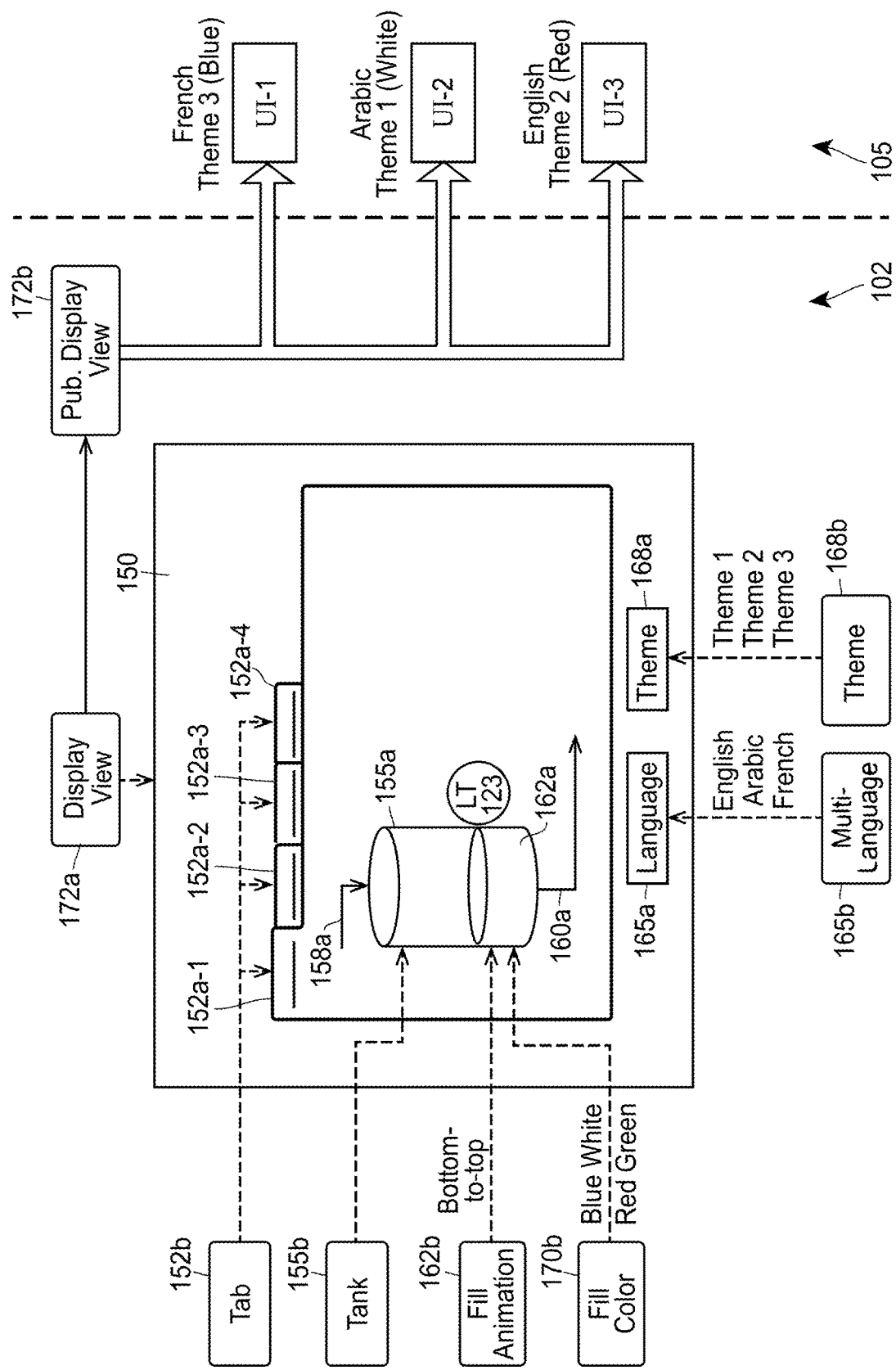
FIG. 2C depicts a block diagram of an example snapshot in time of an in-progress configuring of a display view using the graphical configuration and usage system of FIG. 2A.

To illustrate, FIG. 2C depicts a snap shot of an example display view 150 that is being configured by a user on a canvas provided by the graphical display configuration application 110. At this point during its configuration, the display view 150 has been defined as including several display view elements 152a-168a. In particular, the display view 150 includes a tabbed display element 152a including four tabs 152a-1, 152a-2, 152a-3, and 152a-4, and the tab 152a-1 includes a graphic of a tank 155a including an input flow connection 158a and an output flow connection 160a. Additionally, the tank graphic 155a includes a fill animation 162a via which the liquid level in the tank is represented.

The presentation of the display view 150 may be at least partially influenced by one or more user controls included thereon, e.g., a language user control 165a and a theme user control 168a, which are able to be manipulated by an operator for customization at his or her workstation or user interface 8. Additionally or alternatively, one or more similar user controls 165a, 168a may be provided at the workstation or user interface 8 via the operator application 135 executing the display view 150 at the workstation 8 (not shown in FIG. 2C).

The configuration of the example display view 150 is captured or defined in a corresponding display view object 172a which, in FIG. 2C, is a draft, working, or in-progress configuration object 172a (or otherwise not published). Similarly, the configuration of each of the display view element 152a-168a is captured or defined in one or more respective display view element objects 152b-170b (each of which, at the point in time illustrated by FIG. 2C, may or may not be respectively published, either individually, or as a whole with the display view 150). For example, the tabs 152a-1, 152a-2, 152a-3, and 152a-4 are defined by a graphical tab display element 152a, which itself is defined by an instance of the tab object 152b, where each tab object instance has been, for example, specifically configured to, for example, display a different text string on its respective tabs 152a-1, 152a-2, 152a-3, and 152a-4 and to include other display characteristics and properties thereon (not shown). In some embodiments, each tab 152a-1, 152a-2, 152a-3, and 152a-4 may be respectively configured to change its appearance (e.g., indicators, background color, text color, animations, etc.) responsive to live data, and thereby may be linked to one or more control elements within the operating environment 105 of the process plant 10. The tank graphic 155a is defined by an instance of the tank object 155b, and the tank object instance has been specifically configured to be associated with a specific control tag LT123. Additionally, the fill animation 162a has been defined by an instance of the fill animation object 162b which specifies that the fill animation is a bottom-to-top fill. Further, the color of the fill animation 162a is defined by an instance of a fill color object 170b to be operator-selectable between the colors blue, red, white, and green. For example, the fill color may be individually selectable, or may be selectable by virtue of the operator selecting a particular theme which defines the fill color.

Moreover, as demonstrated in FIG. 2C, configurations of graphical object instances may be defined using other graphical objects and/or object instances. For example, the instance of the tab object 152b that defines the tab 152a-1 is defined to include the instance of the tank graphic object 155b that defines the tank graphic 155a (including, inter alia, the specification therein of the control tag LT123) thereon. Similarly, the instance of the tank graphic object 155b that defines the tank graphic 155a is itself defined to include the instance of the fill animation object 162b for the fill animation 162a, where the instance of the fill animation object 162b has been particularly configured in this example to be a bottom-to-top fill animation. Still, the instance of the fill animation object 162b defining the fill animation 162a is itself defined to include an instance of the fill color object 170b, which defines therein a choice of operator-selectable fill colors (e.g., blue, red, white, and green) and additionally defines the mutually exclusive selection and application thereof.

Generally speaking, a first graphical element object may be defined or configured to refer to (e.g., point to, reference, etc.) a second graphical element object, where the configuration of the second graphical element object defines the appearances and/or behaviors of the first graphical element object. In some embodiments, the configuration or the definition of the first graphical element object may additionally include one or more object property values and/or scripts, if desired. The first graphical element object and the second graphical element object are independent and separate objects. That is, the first graphical element object and the second graphical element object are not included in the same object class, are not derived from each other, are not related by parent/child object relationships, etc. Indeed, the second graphical element object may be referenced by another graphical element object and appropriately configured to thereby define the appearances and/or behaviors of the another graphical element object.

In some scenarios, the second graphical element object itself may reference a third graphical element object, where the configuration of the third graphical element object defines the appearances and/or behaviors of the second graphical element object. If desired, the configuration of the second graphical element object may additionally include one or more object property values and/or scripts.

At any rate, turning back to FIG. 2C, the instance of the display view object 172a defining the view 150 may be configured to display one or more user controls 165a, 168a thereon. (As noted above, in some embodiments, one or more of the user controls 165a, 168a may be provided by the operator application 135 that executes the configured display view object 172a at the user interface device 8 within the operating environment 105, which is not depicted in FIG. 2C.) At any rate, whether provided by the display view object 172a and/or by the operator application 135, each of the user controls 165a, 168a may be defined, at least in part, by its respective object 165b, 168b. In particular, as illustrated in FIG. 2C, the language user control 165a is defined by an instance of the multi-language object 165b which, in this example, has been configured to enable text to be represented in either English, Arabic, or French. As such, during runtime, an operator may manipulate the language user control 165a to selectively change the language that appears in the display view 150 to/from English, Arabic, or French. Similarly, the themes user control 168a is defined by an instance of the themes object 168b, where the instance of the themes 168b, in this example, has been defined to allow the operator, during runtime, to selectively change the theme of the display view 150 among Theme 1, Theme2, and Theme3. As such, during runtime, an operator may manipulate the themes user control 168a on the operator application 135 to change the theme that appears in the display view 150 among Theme1, Theme2, and Theme3. Each of the languages and themes may be defined elsewhere in the graphical configuration database 120, e.g., in the manners described elsewhere in this disclosure.

Further, the display view 150 may be able to be included in various other display view elements 115. For example, a particular Layout1 (e.g., which may be configured as a particular instance of a layout object) may be defined to present the display view 150 in a first area, e.g., by linking the configuration 172a of the display view 150 to the graphical object defining the first area of Layout1. Another particular Layout2 (e.g., which may be configured as another particular instance of the layout object) may be defined to present the display view 150 in a second area, e.g., by linking the display view configuration 170 to the graphical object defining the second area of Layout2. In an additional or alternative implementation, the instance of the display view object 172a may reference one or several layouts (e.g., which may be configured as particular instances of layout objects) that include the display view 150. Each of the layouts that include the display view 150 may be particularly configured to be or to not be presented to the operator when presenting the display view 150 while executing in the runtime environment. In other words, while executing in the runtime environment, the operator application 135 may present the display view 150 according to one of the layouts based on the configuration of the display view object 172a. Additional discussion of layouts that are able to be provided by the graphical display configuration system 100 is provided elsewhere in this disclosure. Similarly, the display view 150 may be linked or otherwise associated with various display hierarchies, and additional discussion of display hierarchies that are provided by the graphical display configuration system 100 is also provided elsewhere in this disclosure.

Returning to FIG. 2C, when the configuration engineer is satisfied with the display view object 172a that defines the content, appearances, and behaviors of the display view 150 in the runtime environment 105, the configuration engineer may publish the display view object as represented in FIG. 2C by the reference 172b.

In an embodiment in which display view elements objects are able to be individually published, upon publication of the display view object 172b, any display view element objects 152b-170b that are not already in a published state may be automatically published, and/or the user may be prompted to manually publish display view element objects that are still in a draft or in-progress state. That is, in such an embodiment, in order for a display view object 172a to be published, any display element objects included therein or linked thereto must also be in a published state.

In another embodiment in which display view element objects are not individually publishable, upon publication of the display view object 172b, the published configuration 172b of the display view 150 is stored in the graphical configuration database 120, thereby making the published configuration 172b available for download into the operating environment 105 of the process plant 10, such as is shown in FIG. 2C. In some embodiments, upon publication of the display view object 172, the published configuration 172b is automatically downloaded into the operating environment 105.

The published configuration of the display view object 172b may be downloaded to one or more user interface devices that are included in the operating environment 105 for execution, as represented in FIG. 2C by user interface devices UI-1, UI-2, UI-3. Each of the user interface devices UI-1, UI-2, UI-3 may take the form of the user interface device 8 or the user interface device 122, for example, and the particular set of user interface devices to which the published display view configuration 172b is to be downloaded (and executed on) may be specified by a user, e.g., via the graphical display configuration application 110 or via another user interface of the configuration environment 120. As such, each downloaded instance of the published display view configuration 172b may execute independently in the runtime environment 105 at its respective host user interface device UI-1, UI-2, UI-3.

Importantly, the published display view configuration 172b, when executing at its host device UI-1, UI-2, UI-3, allows operators or users to customize the appearance and behaviors of a respective executing display view 150 as desired within the runtime environment 105, and independently of the runtime customization of other users. As shown in FIG. 2C, at UI-1, the user of UI-1 has changed the color of the fill animation 162a of the tank graphic 155 on the display view 150 to be blue, has selected that the text displayed on the display view 150 be presented in French, and has selected that the display view 150 be presented using Theme3. At UI-2, the user has changed the color of the fill animation 162*a* to be white, has selected the text to be presented in Arabic, and has selected Theme1. At UI-3, the user has changed the color of the fill animation 162*a* to be red, has selected the text to be presented in English, and has selected Theme2. The user selections and customizations implemented at user interface devices UI-1, UI-2, and UI-3 are effected solely using the respective published display view configurations 172*b* executing respectively at the host devices UI-1, UI-2, and UI-3. That is, to implement the operator-desired changes, none of UI-1, UI-2, or UI-3 needs to obtain additional configuration data from the configuration environment or from any other computing device. Moreover, to implement the operator-desired changes, an updated configuration for the display view 150 is not required to be downloaded and executed. Rather, each operator simply implements desired changes in line with the runtime execution of the display view 150 at his or her respective user interface device UI-1, UI-2, UI-3, e.g., without needing to stop and re-start the display view 150. For example, if the user of UI-I subsequently wishes to change the displayed theme from Theme3 to Theme2, the user may do so by merely making the selection via the Theme User Control 168*a* executing at UI-1 (which may, as discussed above be provided by the operator application 135 or by the display view 150), and in response the executing display view 150 will implement the change, e.g., without having to communicate with any other computing device included in the configuration environment 102 and/or with any other computing device that is able to access configuration data 120 or copies thereof.

Of course, the example scenario depicted in FIG. 2C is meant to be illustrative but not limiting, and is only one of many possible usage scenarios of the graphical display configuration and usage system 100. Indeed, as is demonstrated within this disclosure, the graphical display configuration and usage system 100 provides a configuration environment 102 that is flexible, intuitive, and easy to maintain, while simultaneously providing an operating experience that supports independent, on-line operator customization of display views and/or of display elements included thereon. The various features and aspects (either alone, or in combination) of the graphical display configuration and usage system 100 which provide these and other benefits are described in more detail below.

Display Navigational Hierarchy

Figure 3A:
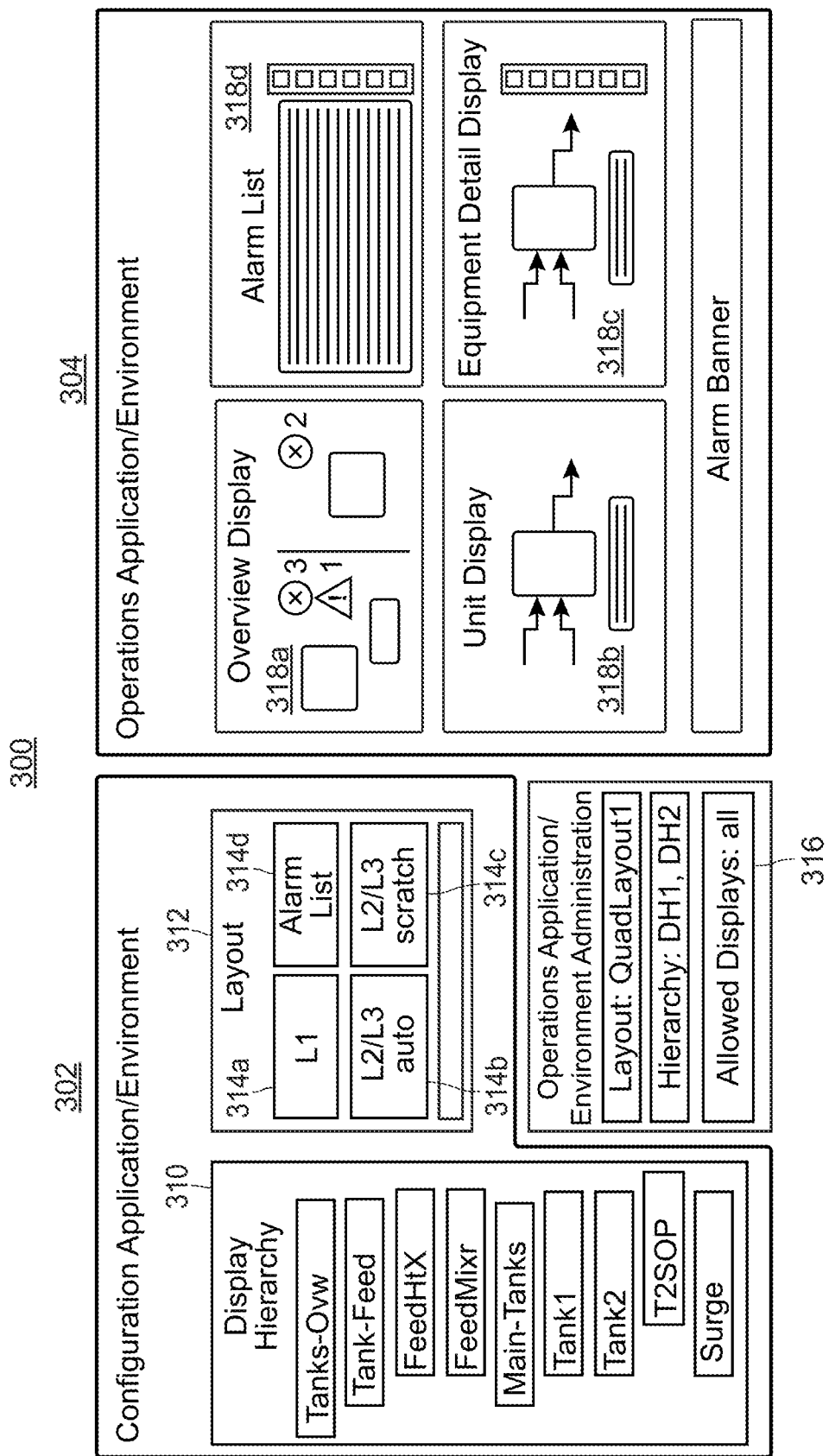
FIG. 3A is an example view of a graphical display configuration application for defining graphics and an example view of an operator application for presenting the graphics according to the definitions from the graphical display configuration application.

Turning now to FIG. 3A, examples of types of display view elements that are provided by the graphical display configuration and usage systems and methods described herein are a hierarchy display view element and a layout display view element. As mentioned above, to generate graphics in a process control system, the graphical display configuration application 110 in the configuration environment 102 includes graphical user controls for defining hierarchies and layouts, thereby allowing a configuration engineer to define the hierarchy and layout graphically. Each display view may be made up of display view elements which define the display view. For example, a "Main-Tanks" display view may include several display view elements each representing a different tank. A display view element in one display view may also be the subject of another display view at a higher level of detail having its own display view elements. In this manner, a plant operator may navigate from a display view depicting a general overview of the process plant at the lowest level of detail to a display view depicting a single alarm or device within the process plant at one of the highest levels of detail.

In some embodiments, a display view depicts a section of a process plant and the display view elements include graphical representations of process plant entities, such as tanks, mixers, valves, pumps, and/or any other suitable equipment within a process plant. The display view elements may also include graphical representations of process plant connection entities that connect one piece of equipment to another, such as pipes, electrical wires, conveyor belts, etc.

In some embodiments, the configuration engineer may define the alarms, trends, and/or process parameter values within a display view at a particular level of detail. In other embodiments, the configuration engineer may define the number of alarms, trends, and/or process parameter values within the display view at a particular level of detail. The graphical display configuration application 110 or the operator or operations application 135 executing on the operator user interface device 122 may then automatically determine which alarms, trends, and/or process parameter values to include on the display view based on priority levels for the respective alarms, trends, and/or process parameter values. For example, the configuration engineer may indicate that five process parameter values will be presented at particular locations within the display view. Each of the process parameter values corresponding to the display view may be ranked according to priority level and the top five ranking process parameter values may be presented in the display view. The priority levels may be determined by the configuration engineer, the operator, or may be automatically determined based on a set of rules, such as whether a particular process parameter value triggers an alarm.

To create a hierarchy of display views for navigating from a display view depicting a general overview of the process plant to display views depicting sections of the process plant at higher levels of detail, the graphical display configuration application 110 includes graphical user controls for defining relationships or links between display views. The graphical display configuration application 110 may present a user interface or a portion thereof for creating the hierarchy. The hierarchy UI may include indications of each of the display views defined in the configuration environment. The configuration engineer may then drag and drop display views (or may use any other suitable graphical user control) into a hierarchy pane to define the relationships or links between the display views. For example, by dragging and dropping an indication of a "Tank 1" display view (e.g., the name "Tank 1," an icon, etc.) onto an indication of a "Main-Tanks" display view, the graphical display configuration application 110 may determine that Tank 1 is a subview at a higher level of detail than the "Main-Tanks" display view. In another example, by dragging and dropping an indication of a "Tank-Feed" display view above or below the indication of the "Main-Tanks" display view within the hierarchy pane, the graphical display configuration application 110 may determine that the "Tank-Feed" and "Main-Tanks" display views are at the same level of detail within the hierarchy.

Display view hierarchies may also be created for trend display views representing historized process parameter values. For example, a process parameter such a flow rate through a valve may depend on one or several input or output process parameters, such as an inlet pressure at the valve and an outlet pressure at the valve. A Level 1 trend display view may depict flow rates through the valve over time while a Level 2 trend display subview of the Level 1 trend display view may depict inlet and outlet pressures at the valve over time. The configuration engineer may create the trend display view hierarchy in the configuration environment 102, and an operator may maneuver between resulting trend display views and subviews (e.g., via navigation buttons) within the operating environment 105 at increasing or decreasing levels of detail.

In some embodiments, a display view hierarchy may resemble a tree structure where a display view at the lowest level of detail (e.g., Level 1) is the root node of the tree structure. Display views at the second lowest level of detail (e.g., Level 2) may be children nodes with respect to the root node and may each have their own children nodes at the third lowest level of detail (e.g., Level 3) which may be grandchildren nodes with respect to the root node. The configuration engineer may create several display view hierarchies which may each correspond to different areas within a process plant or different process plants. In this manner, each operator may view the display view hierarchy representing the area for which she is responsible.

In addition to defining display view hierarchies, the graphical display configuration application 110 includes graphical user controls for defining a layout. As used herein, a "layout" may indicate the manner in which to divide a display screen area of an operator workstation to present several display views on a display screen or a plurality of display screens for the operator workstation. For example, an operator workstation may include multiple monitors or display screens and the layout may cause the operator workstation to present a different display view on each of the display screens, so that the operator may watch several display views at a time. In another example, an operator workstation may include a single monitor or display screen and the layout may cause the operator workstation to divide the display screen into several regions (e.g., frames, sub-areas, or portions) and present a different display view on each region of the display screen. The graphical display configuration application 110 may include graphical user controls for selecting the number of display screens and display regions within each display screen for a layout. For example, the configuration engineer may generate a first layout having two display screens, where each display screen is divided into two display regions. Then the configuration engineer may define a display view type for each of the divided display regions, such as watch area, alarm list, historized parameters, a faceplate, hierarchy level (e.g., Level 1, Level 2, Level 3), etc.

Furthermore, the layout may include relationships or links between the display regions within the layout. For example, a first display region within the layout may present hierarchy Level 1 type display views and a second display region within the layout may present hierarchy Level 2 type display views. The second display region may be configured to present hierarchy Level 2 display views when the operator navigates from hierarchy Level 1 in the first display region. The display view for the second display region depends on the activity of the operator with respect to the first display region and the first display region continues to present hierarchy Level 1 type display views. In another example, display regions within the layout depicting alarm list or historized parameter display views may depend on display regions within the layout depicting control modules, so that the alarm list or historized parameter display views include alarms or parameters being displayed within the control modules.

FIG. 3A illustrates, an example side-by-side view 300 of a graphical display configuration application UI 302 (which may, for example, be an instance of the graphical display configuration application 110) and an operator application UI 304 (which may, for example, be an instance of the operator application 135) depicting the display view elements during runtime as defined by the graphical display configuration application UI 302. More specifically, the graphical display configuration application UI 302 includes a hierarchy pane 310 indicating the hierarchy of a set of display views. For example, the "Tanks-Ovw" display view may be at Level 1 of the display view hierarchy and the "Tank-Feed" and "Main-Tanks" display views may be at Level 2. The "FeedHt X" and "FeedMixr" display views may be subviews of the "Tank-Feed" display view and the "Tank1," "Tank2," and "Surge" display views may be subviews of the "Main-Tanks" display view at Level 3. Additionally, the "T2SOP" display view may be a subview of the "Tank 2" display view at Level 4. As mentioned above, a configuration engineer may define the display view hierarchy by dragging and dropping indications of the display views into a hierarchy pane 310 presented by the graphical display configuration application 110 or by using any other suitable graphical user controls. Indications of new display views may also be defined in the display view hierarchy before the corresponding display views are created. The configuration engineer may define where the new display view is located within the display view hierarchy and then create the new display view.

In addition to depicting the hierarchy pane 310, the graphical display configuration application UI 302 depicts a layout 312 which divides a display into four display screens and four display regions 314*a-d* (also referred to interchangeably herein as "display sub-areas" or "display portions"), and each display region 314*a-d* has a corresponding display view type. For example, the upper left corner display region 314*a* is defined to present hierarchy Level 1 display views. The lower left and lower right corner display regions 314*b-c* are defined to present hierarchy Level 2 and Level 3 display views and the upper right corner display region 314*d* is defined to present alarm list display views. The layout 312 also defines relationships or links between the display regions. For example, the lower left corner display region 314*b* automatically presents hierarchy Level 2 display views in response to an operator navigating from a hierarchy Level 1 display view to a hierarchy Level 2 display view in the upper left corner display region 314*a*. In another example, the upper right corner display region 314*d* may automatically display alarm lists of alarms included in one or more of the display views in the other display regions 314*a-c*.

The operator application UI 304 includes the layout 312 defined by the graphical display configuration application 110 which divides a display of an operator workstation into four display screens and four display regions 318*a-d*. The upper left corner display region 318*a* presents hierarchy Level 1 display views. The lower left and lower right corner display regions 318*b-c* present hierarchy Level 2 and Level 3 display views and the upper right corner display region 318*d* presents alarm list display views. The operator application UI 304 may present display views according to the hierarchy, layout, and/or other display view elements defined by the graphical display configuration application 110.

The graphical display configuration application UI 302 also includes an administration section 316 (which may, for example, relate to the administration of the operations application/environment 304) for assigning hierarchies, layouts, and/or themes to a particular operator workstation or set of operator workstations. In this manner, operator workstations for operators who monitor one section of the process plant may present hierarchies related to that section and may be restricted from accessing hierarchies related to other sections of the process plant. In some embodiments, a configuration engineer may assign all hierarchies and layouts to each operator workstation via the administration section 316 and the operators may select the layout and hierarchy to present on their respective operator workstations.

Figure 3B:
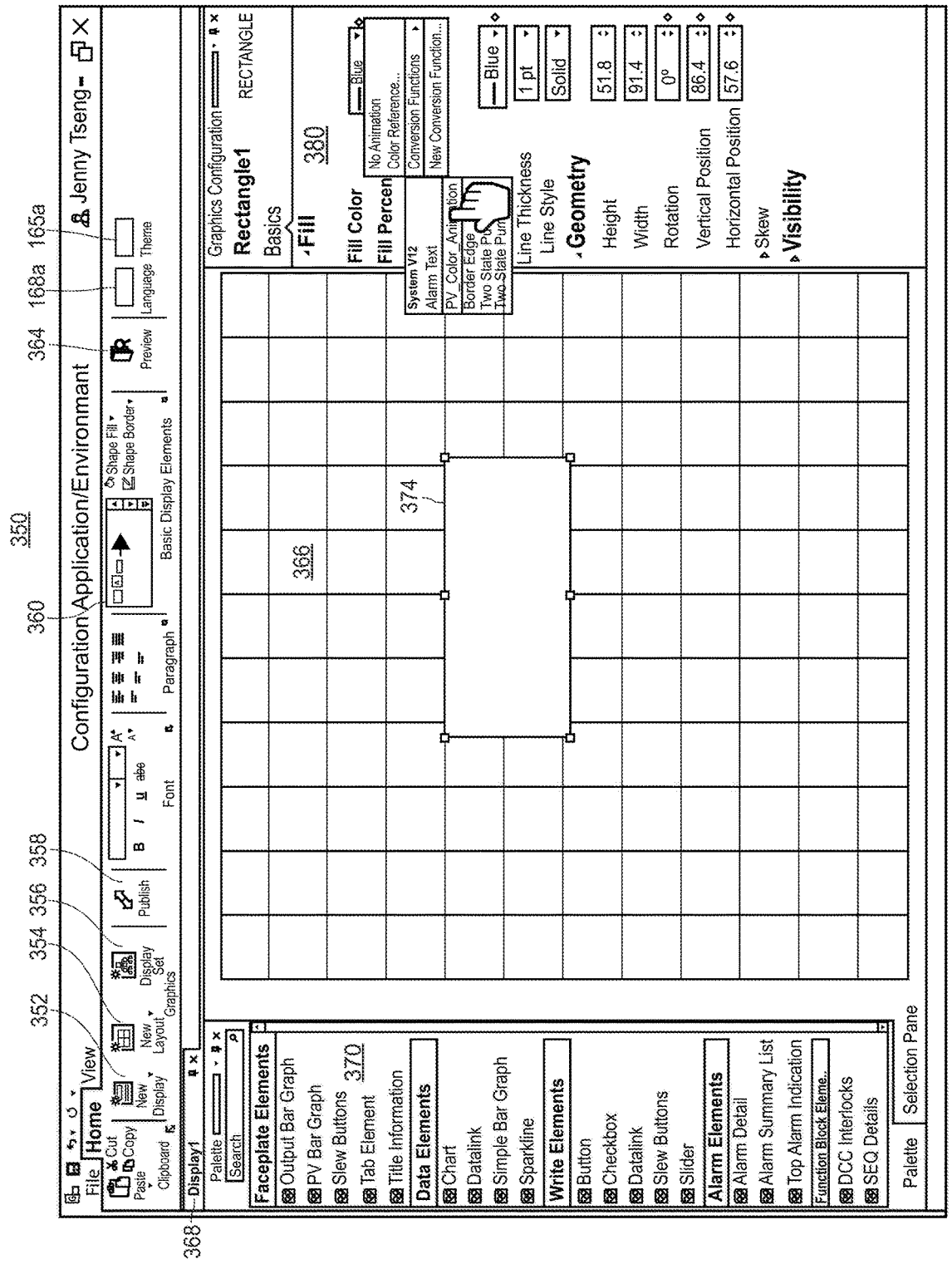
FIG. 3B is an example detailed view of a graphical display configuration application for defining graphics.

FIG. 3B illustrates a home tab 350 of the graphical display configuration application 110 for generating display views that are to be executed on an operator workstation. The home tab 350 includes a new display button 352 for creating a display view, a new layout button 354 for creating a layout, and a new display hierarchy button 356 for creating a hierarchy of display views. The home tab 350 also includes a configuration canvas 366 for configuring display view elements within a display view. The display view elements may be viewed in a configure mode upon selection of a configure button (not shown) and/or a preview mode upon selection of a preview button 364. In an alternate embodiment, the draft or working configuration of the display view elements may be presented (e.g., by default, or continuously presented) on the canvas provided by the configuration application 110, and only a preview button 364 may be displayed (e.g., as is illustrated by FIG. 3B), an activation of which causes a preview of the display view to be displayed in another area or window of the user interface provided by the configuration application 110. The preview mode or the separate display of the preview presents a preview of the display view as it would appear during runtime, so that a configuration engineer may see how the display view and display view elements will look to the operator. For example, the display view elements may be presented with themes, colors, etc. selected in the configuration mode. The configuration engineer may toggle graphical user controls, such as navigation bars, tab bars, etc. on the display view in the preview mode to see how the display view changes in response to user interactions.

To create a display view, the home tab 350 includes graphical user controls for selecting display view elements, such as a basic display elements button 360 which includes shapes such as rectangles, squares, circles, etc., arrows, connectors, text boxes, charts, or any other suitable basic display elements. A display view element selection pane or palette 370 may also be included for selecting display view elements such as faceplate elements, tab elements, bar graph elements, data elements, datalink elements, write elements, buttons, sliders, alarm elements, alarm detail elements, function block elements, navigation bar elements, GEM elements (e.g., such as described in co-owned U.S. patent application Ser. No. 15/692,450 filed on Aug. 31, 2017 and entitled "Derived and Linked Definitions with Override," the entire disclosure of which is incorporated by reference herein), or any other suitable display view elements. The configuration engineer may select display view elements by dragging and dropping the display view elements into the configuration canvas 366 or by using any other suitable graphical user controls. For example, in FIG. 3B the configuration engineer may select the new display button 352 to create a display view for Display1 (ref. no. 368) and may drag and drop a rectangle 374 from the basic display elements button 360 into the configuration canvas 366.

When the rectangle 374 is selected, the properties of the rectangle 374 are presented in an editing pane 380. The editing pane 380 may indicate several properties of the rectangle, such as the rectangle name (Rectangle 1), fill color (white), fill percentage (100%), line color (black), line thickness (1 pt.), line style (solid), etc. Each of the properties may be adjusted in the editing pane 380 via graphical user controls such as drop-down menus or free-form text fields. For example, the line thickness property may include a drop-down menu for selecting one of several line thickness values, such as 0.5 pt., 1 pt., 1.5 pt., etc. The fill color property may include a color palette for selecting one of several colors or a free-form text field for entering RGB color values. In some embodiments, the properties may also be adjusted via graphical user controls at the rectangle 374, such as via a pop-up menu in response to right clicking or double clicking on the rectangle 374. The properties included in the editing pane 380 are merely a few example properties for the rectangle 374. Additional or alternative adjustable properties may also be presented.

Furthermore, relationships or links between display view elements may be established by for example, connecting display view elements via lines or other connectors. Relationships or links may also be established by referencing other display view elements in the properties of a display view element. For example, a first display view element may represent a tank in the process plant. A second display view element may represent a process parameter value for the tank such as a fill percentage. In some scenarios, the configuration engineer may reference the first display view element in the properties of the second display view element so that the first and second display view elements are associated and included together in one or several display views. In some embodiments, each of the linked display view elements associated with a process plant entity or process control element may reference a control tag that refers to control modules, nodes, devices (e.g., field devices), and/or signals that are received and/or transmitted by devices, control modules, or nodes corresponding to the process plant entity.

In any event, the home tab 350 also includes a publish button 358 to publish a graphic (a display view, layout, or display view hierarchy) to the graphical configuration database 120. The published graphics may then be provided to a set of operator workstations and presented to the corresponding operators during runtime.

Layouts of Operator Workstations/Computing Devices

Typically, layouts in a process control system are created using programming scripts. Accordingly, the resulting configurations may be difficult and time consuming for a configuration engineer to develop. Additionally, maintaining, extending, and troubleshooting the configurations may be difficult and may require configuration engineers to have extensive scripting knowledge and training.

Figure 4:
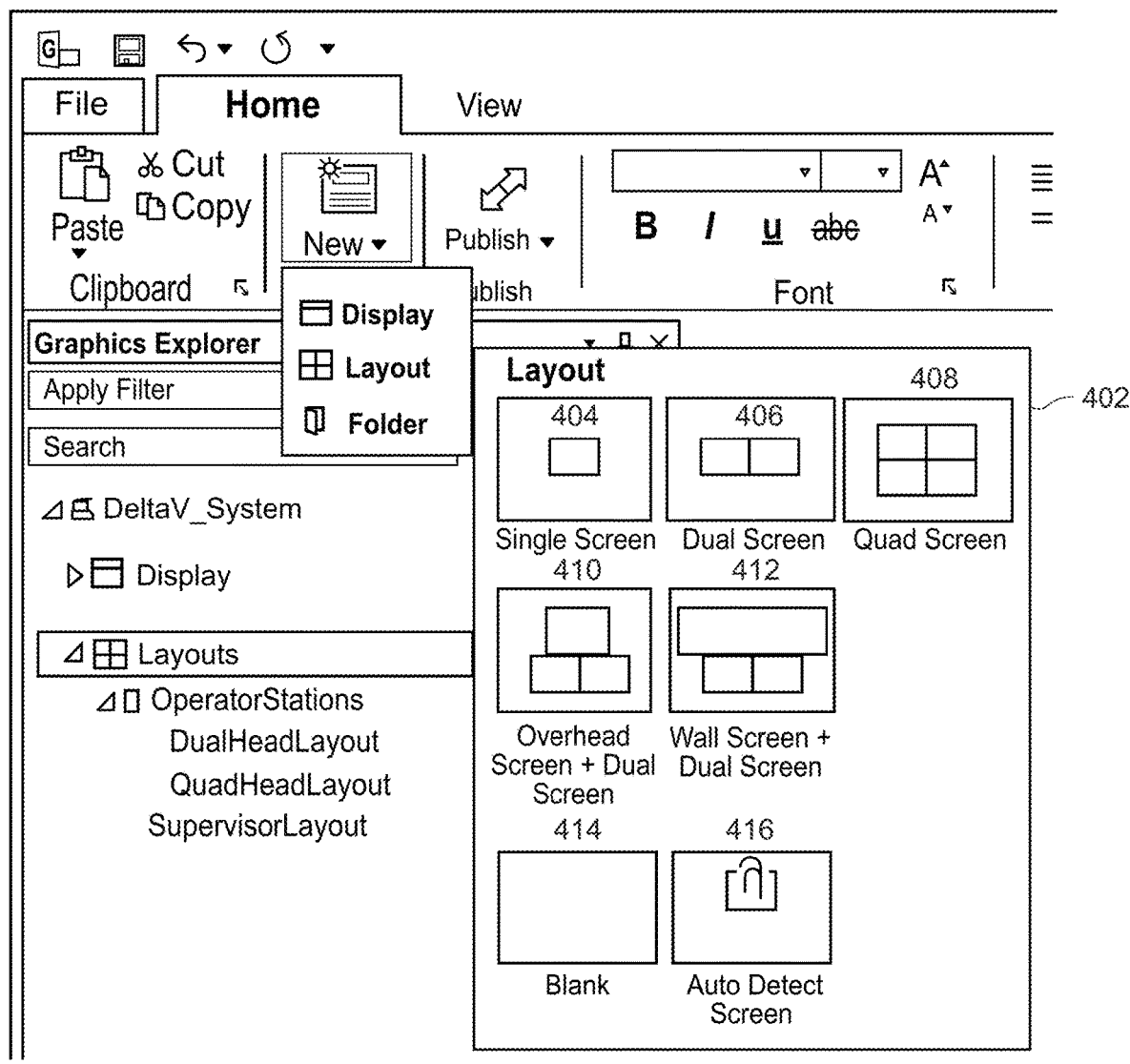
FIGS. 4-5 illustrate an example of configuring a layout display view element which may be provided by a graphical display configuration application.

The graphical display configuration application 110 removes or reduces the need for scripting when configuring layouts by presenting graphical user controls for the configuration, thereby allowing a layout to be defined graphically. FIG. 4 illustrates a layout portion 400 of the home tab 350 when the configuration engineer selects the new layout button 354. In response to selecting the new layout button 354 in FIG. 3B, the graphical display configuration application 110 presents a layout menu 402 including several selectable layouts, such as a single display screen layout 404, a dual display screen layout 406, a quad display screen layout 408, an overhead and dual display screen layout 410, a wall screen and dual display screen layout 412, etc. The layouts may be presented in 16:9, 16:10, and/or 4:3 aspect ratios. In some embodiments, in addition to receiving a selection of one of the layouts, the graphical display configuration application 110 may provide a graphical user control for adjusting the sizes of the display screens relative to each other in a selected layout. For example, the dual display screen layout 406 divides the display horizontally into two equal sized display screens. The graphical display configuration application 110 may include a graphical user control for resizing and/or repositioning one of the display screens to for example, cover three-quarters of the display area while the other display screen covers the remaining quarter.

The layout menu 402 also includes an auto detect button 416 for automatically detecting the display screen size of the UI device 8 executing the graphical display configuration application 110. A configuration engineer may select the auto detect button 416 when the UI device 8 executing the graphical display configuration application 110 is an operator workstation. Otherwise, the configuration engineer may select the blank layout button 414 to manually configure the screen size for the layout. For example, the configuration engineer may create several layouts each for a different screen size. During runtime and upon publishing the several layouts, an operator workstation may present one of the layouts having the same display screen size as the operator workstation. More specifically, a first layout may be created for a mobile display screen area, a second layout may be created for a tablet display screen area, a third layout may be created for a desktop display screen area, a fourth layout may be created for a wall display screen area, etc. The operator application 135 may automatically identify the layout having the same display screen size as the operator workstation. In other embodiments, the operator may be presented with indications of each of the layouts and the operator may select the layout for the operator workstation. The operator may also be able to resize the layout and/or display regions of the layout via graphical user controls provided by the operator application 135.

In some embodiments, the operator may be presented with indications of layouts or display view hierarchies viewed by other operators and may be able to select a layout or display view hierarchy viewed by a particular operator or group of operators within the process control system. In this manner, a group of operators working together may see the same graphics on their respective display screens.

While a multi-screen layout may be presented on an operator workstation having multiple monitors, the multi-screen layout may also be presented on a single monitor or display screen and the single display screen may be divided into multiple display screens according to the multi-screen layout. Additionally, a single-screen layout may be presented on an operator workstation having multiple monitors, where the single-screen layout is sized to fit across each of the multiple monitors. Still further, in some embodiments, a UI device 8 such as the operator workstation may execute multiple instances of a user interface at the same time. For example, the UI device 8 may execute multiple instances of the operator application 135 at the same time to view two multi-screen layouts in different windows presented by the same monitor. In other embodiments, the UI device 8 may execute multiple instances of the graphical display configuration application 110.

In addition to selecting the layout from the layout menu 402, a layout pane may be presented by the graphical display configuration application 110, where the layout pane includes display screens and display regions. The configuration engineer may drag and drop display screens and display regions from the layout pane into a configuration canvas 366 of the graphical display configuration application 110 to define the number, position, and size of display screens and display regions for the layout.

Figure 5:
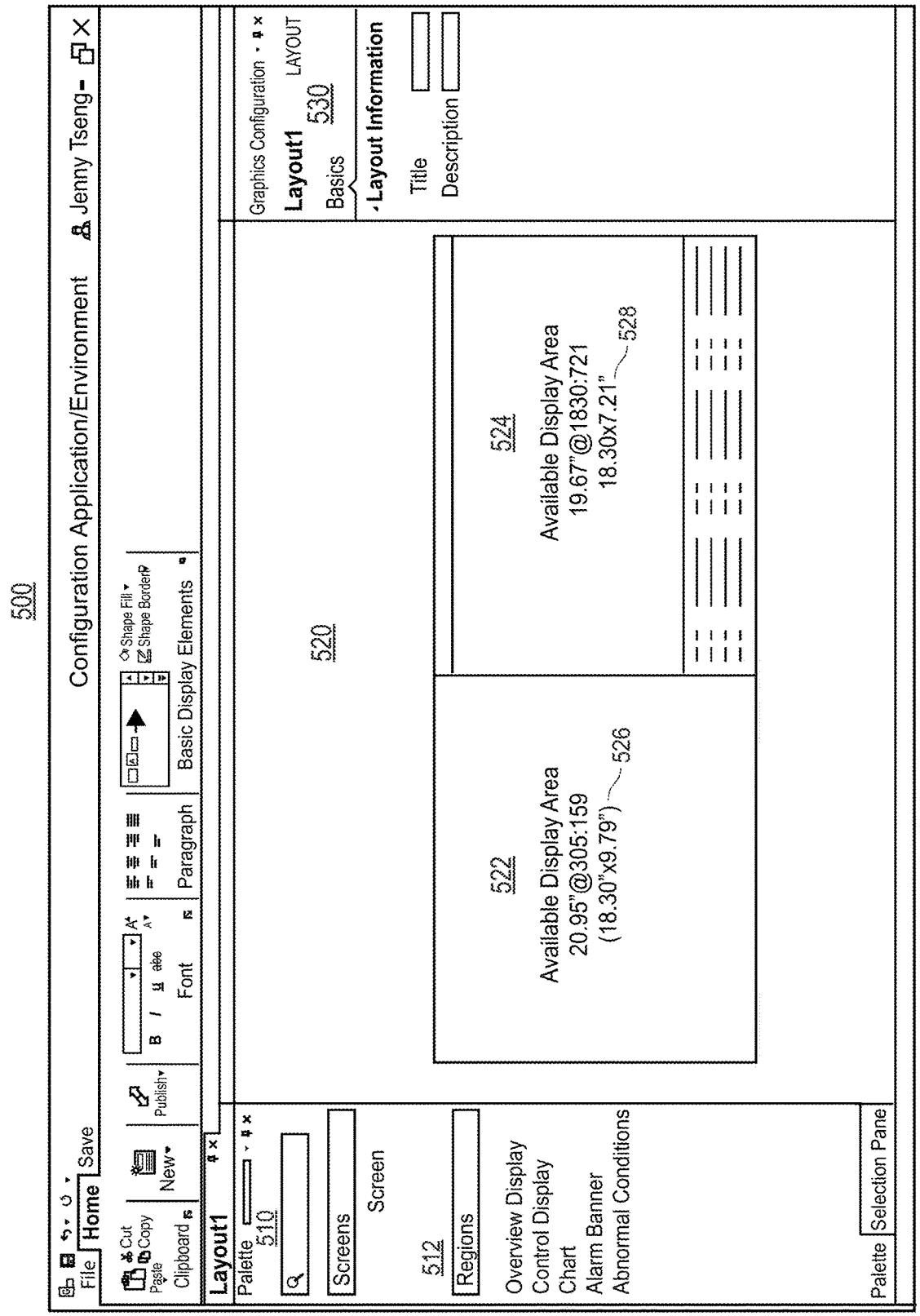

FIG. 5 illustrates an example layout screen 500 of the graphical display configuration application 110 for selecting display regions, sizes of the display regions, and corresponding display view types for the display regions in a layout. The layout screen 500 includes a layout pane 510 which indicates the display view types for each display region 512 in the layout. The display view types may be selected from several display view types, such as watch area, alarm list, alarm banner, historized parameters, faceplate, hierarchy level (e.g., Level 1, Level 2, Level 3), etc. The configuration engineer may drag and drop display view types into the display regions 512 portion of the layout pane 510, may define the display view types in the editing pane 530, and/or may define the display view types using any suitable graphical user control. In the example layout screen 500, the display view types include an overview display, a control display, a chart, an alarm banner, and abnormal conditions.

The layout screen 500 also includes a configuration canvas 520 that presents a preview of the layout according to the display view types, number of display screens, display regions, and display screen sizes. In this example, a dual-screen layout is selected and the configuration canvas 520 includes two display screens 522, 524 each having a display screen size of 18.30"×9.79". The display screen size may be determined from the auto detect button 416 in FIG. 4, may be a default display screen size for a desktop monitor, or may be defined by the configuration engineer for example in the editing pane 530.

The configuration engineer may then drag and drop display view types for each display region 512 onto the display screens 522, 524 and each display screen 522, 524 may indicate the amount of available display area remaining. For example, display view types have not been defined for the display screen 522 and the display screen 522 has the entire display area remaining (18.30"×9.79"). A navigation bar and a parameter value display view type have been defined for the display screen 524 and as a result, the amount of available display area for the display screen 524 has been reduced from 18.30"×9.79" to 18.30"×7.21".

In some embodiments, the size of each display region is configurable and the configuration engineer may define the dimensions of each display region in inches, centimeters, points, etc. When the display screen size shown on the configuration canvas 520 is the same as the display screen size for an operator workstation, the display regions may be presented on the operator workstation having the same dimensions defined by the graphical display configuration application 110, so that the preview on the configuration canvas 520 looks the same as the view at the operator workstation. On the other hand, when the display screen size shown on the configuration canvas 520 differs from the display screen size for an operator workstation, the display regions may be resized to fit the display screen of the operator workstation. However, the aspect ratios for the display regions may not be adjusted to prevent skewing the display views in each display region.

Also in some embodiments, each display region has a default size so as to divide each display region equally amongst the display screen. Additionally, the default size may depend on the display view type for the display region. For example, an overview display may have a larger default size than an alarm banner.

The configuration engineer may continue to drag and drop display view types for each display region onto the display screen 522, 524 until the entire display screens are filled. If an additional display view type is added to a display screen that has been filled, the sizes for the display regions already on the display screen may be adjusted to make room for the additional display view type. In some embodiments, the graphical display configuration application 110 automatically adjusts the sizes for the display regions already on the display screen to make room for the additional display view type. Also, in some embodiments, as the configuration engineer drags an additional display view type onto the display screen 522, 524, the graphical display configuration application 110 presents a preview of the adjusted sizes for the display regions to make room for the additional display view type.

Figure 6A:
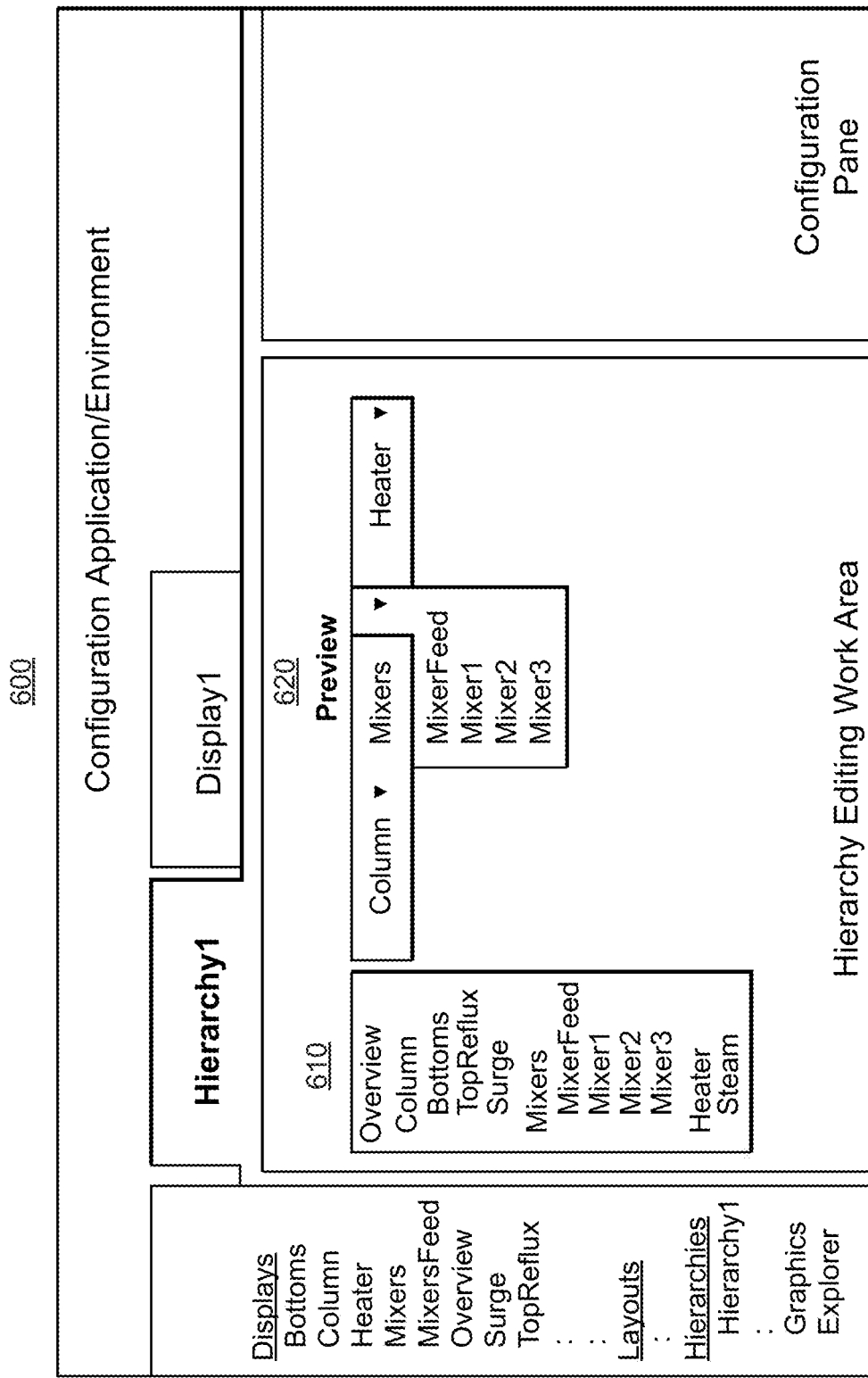
FIG. 6A illustrates an example hierarchy screen for configuring and previewing a hierarchy of display views, which may be provided by a graphical display configuration application.

As mentioned above, the graphical display configuration application 110 presents graphics in a configuration mode and a preview mode. FIG. 6A illustrates an example hierarchy screen 600 that presents a display view hierarchy in the preview mode or as a draft or working configuration presented on the canvas provided by the graphical display configuration application 110. The configuration engineer may select a particular hierarchy from several hierarchies to preview, such as Hierarchy 1. The example hierarchy screen 600 includes a hierarchy pane 610 for viewing the hierarchy of display views. An interactive preview 620 is also included for selecting navigation buttons from a navigation bar to verify that the navigation bar presents the display views according to the hierarchy. The hierarchy pane 610 indicates that an overview display view is at the lowest level of detail (Level 1) and a column display view, mixers display view, and heater display view are at Level 2. The column display view includes three subviews: bottoms, top reflux, and surge. The mixers display view includes four subviews: mixer feed, mixer1, mixer2, and mixer3, and the heater display view includes one subview: steam.

The resulting navigation bar presented in the interactive preview 620 includes three navigation buttons corresponding to the three Level 2 display views. Upon selection of the mixers navigation button, a drop-down menu is presented and includes indications of each of subviews of the mixers display view for the operator or configuration engineer to toggle between the display view and its subviews. During runtime, an operator may view a display view by selecting the indication of the display view from one of the drop-down menus in the navigation bar. In some embodiments, the graphical display configuration application 110 includes graphical user controls for selecting an initial display view within the hierarchy to present to the operator during runtime (e.g., at startup of the operator application 135). The graphical display configuration application 110 includes user controls for selecting an initial display view by name (e.g., "Column") or by position within the hierarchy. For example, when the configuration engineer selects the initial display view as "1-1-2," the operator application 135 presents the second Level 3 display view which is a subview of the first Level 2 display view which is a subview of the first Level 1 display view within the hierarchy. In the example hierarchy shown in FIG. 6A (Hierarchy1), position "1-1-2" corresponds to the "Top Reflux" display view which is the second Level 3 display view and is a subview of the first Level 2 display view ("Column"), which is a subview of the first Level 1 display view ("Overview").

Figure 6B:
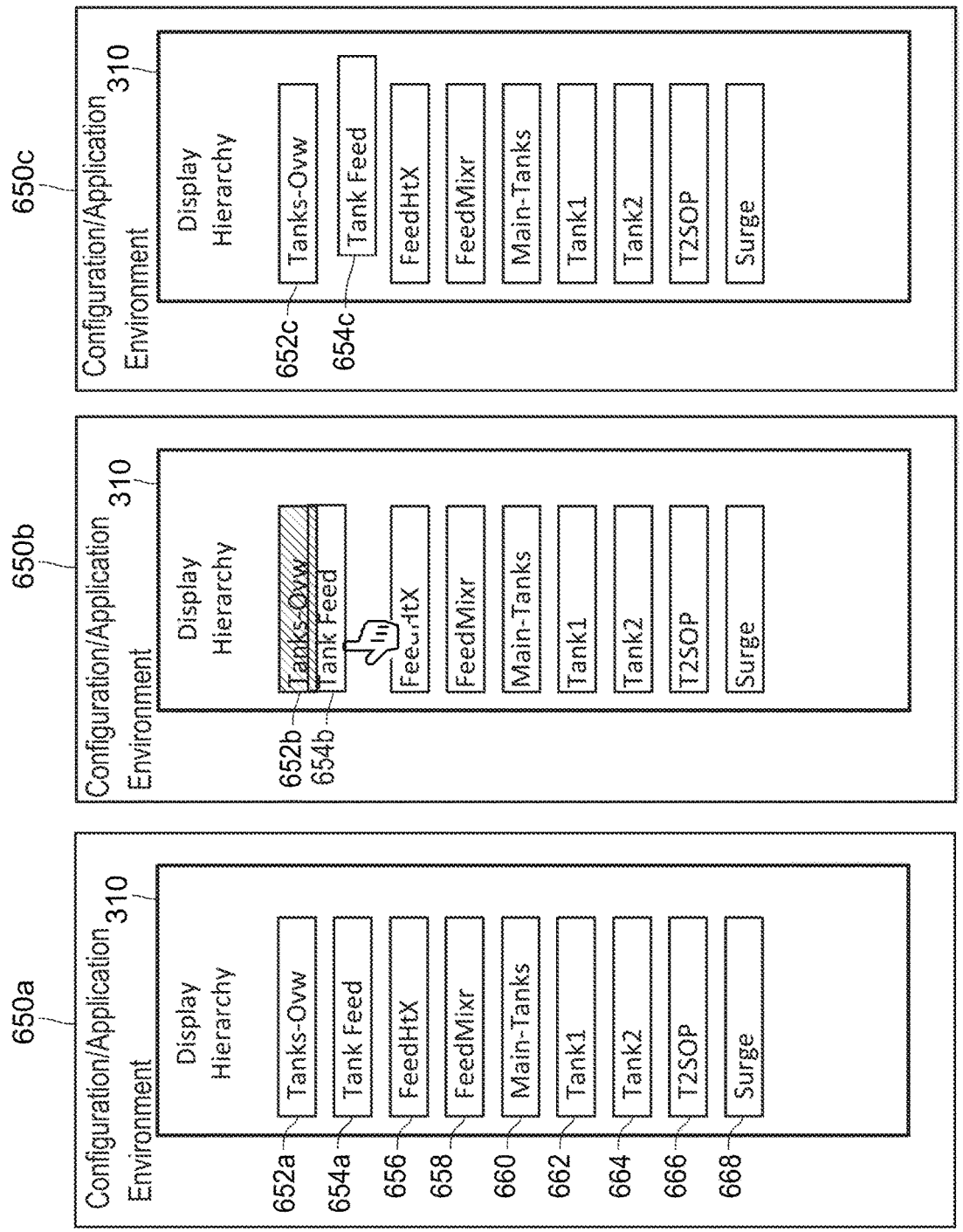
FIG. 6B is an example animation of a view of a graphical display configuration application for configuring the hierarchy of display views.

FIG. 6B illustrates an example animation for configuring a display view hierarchy in the configuration mode of the graphical display configuration application 110. More specifically, the animation illustrates three states of a portion of a graphical display configuration application UI 650*a-c* including a hierarchy pane 310 similar to the hierarchy pane 310 as shown in FIG. 3A, when configuring a display view hierarchy. In the first state, the graphical display configuration application UI 650*a* presents indications of display views 652-668 arranged so as to indicate that each of the display views 652 has the same level of detail of 1 and none of the indicated display views are subviews of each other. In the second state, the graphical display configuration application UI 650*b* receives, via a graphical user control such as a drag-and-drop function, a request to make the "Tank Feed" display view 654*b* a subview of the "Tanks-Ovw" display view 652*b*. Accordingly, in the third state, the graphical display configuration application UI 650*c* presents the indication of the "Tank Feed" display view 654*c* tabbed to the right of the indication of the "Tanks-Ovw" display view 652*c* to signify that the "Tank Feed" display view 654*c* is a subview of the "Tanks-Ovw" display view 652*c*. Furthermore, the "Tank Feed" display view 654*c* is assigned a level of detail of 2, so that the level of detail for the "Tank Feed" display view 654*c* is one level above the level of detail for the "Tanks-Ovw" display view 652*c*.

Turning back to FIG. 6A, if the configuration engineer is satisfied with the interactive preview 620, she may select the publish button 358 as shown in FIG. 3B to publish the display view hierarchy and corresponding navigation bar. On the other hand, the navigation bar may be edited in the configuration mode to include a single overview navigation button or to configure the navigation buttons in any other suitable manner. The configuration engineer may also adjust the display view hierarchy in the configuration mode by adjusting the hierarchy levels of the display views, adding or removing display views from the hierarchy, adding or removing subviews from a display view, or in any other suitable manner as described above with reference to FIG. 3A.

Figure 7A:
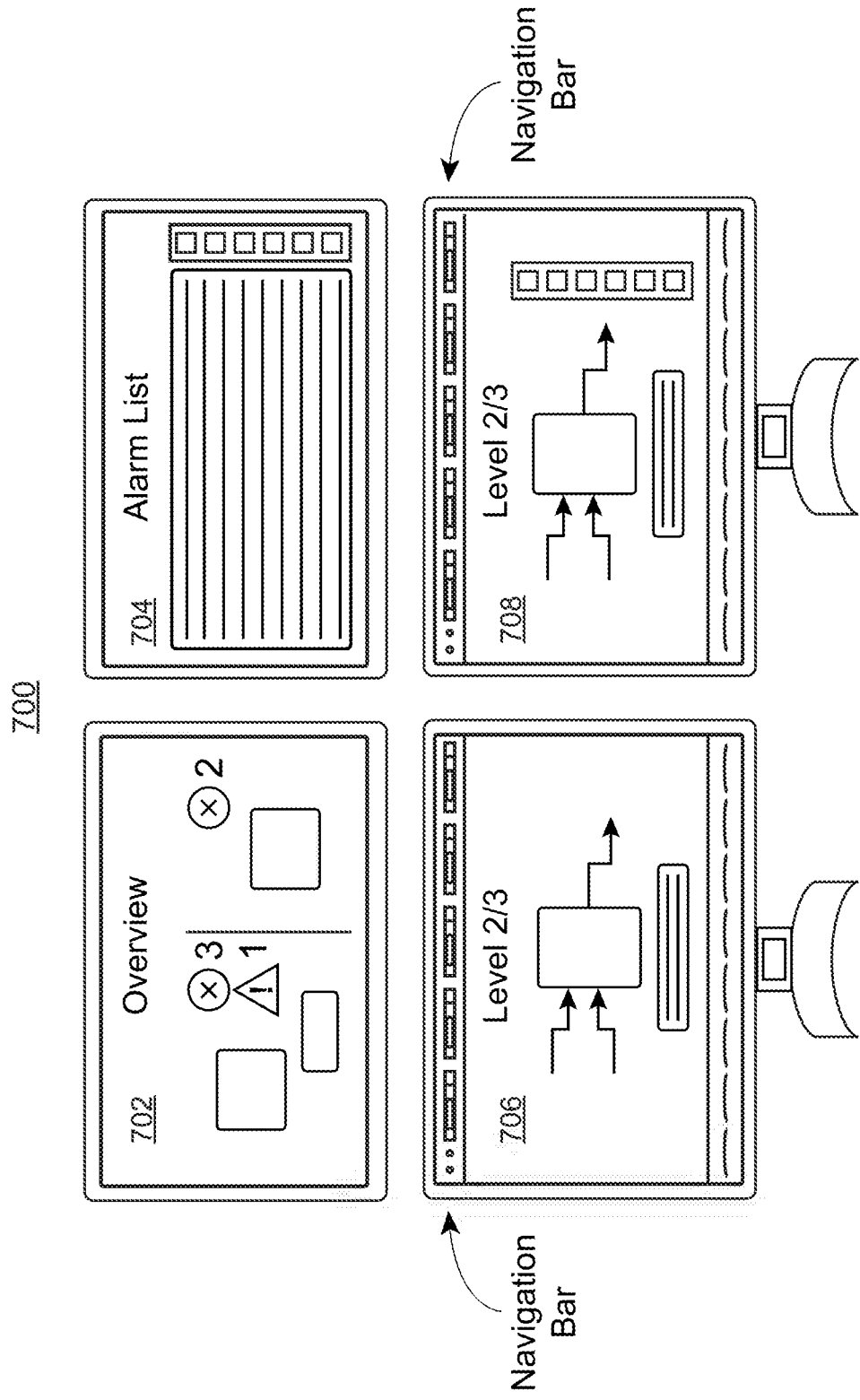
FIG. 7A is an example view of an operator application for presenting the graphics according to the definitions from the graphical display configuration application within the display screen area of an operator workstation.

When the graphical display configuration application 110 publishes the graphics, the published graphics are presented on the display screen of an operator workstation. An example operator workstation display 700 is illustrated in FIG. 7A. The operator workstation display 700 is divided into four display screens and five display regions according to the layout defined by the graphical display configuration application 110. Additionally, the operator workstation display 700 presents display views in accordance with the display view types for each display region and the display view hierarchy defined by the graphical display configuration application 110. For example, a first display region 702 presents display views having a hierarchy Level 1 process section display view type, a second display region 704 presents display views having an alarm list display view type, a third display region 706 presents display views having hierarchy Level 2/Level 3 process section display view types, a fourth display region 708 presents display views having hierarchy Level 2/Level 3 process section display view types, and a fifth display region present an alarm banner at the bottom of the lower two display screens. In this manner, the operator may view an overview of the process plant, Level 2 and Level 3 subviews of the process plant, and an alarm list corresponding to alarms within the Level 1, 2, or 3 display views. The third and fourth regions 706, 708 also include navigation bars for selecting other Level 2 and Level 3 process section display views within the display view hierarchy and/or for selecting process section display views in other hierarchies. The third region 706 may also be configured to automatically present a Level 2 process section display view corresponding to user input from the operator in the first region 706. For example, when the operator navigates to a Level 2 process section display view via a graphical user control included in the first region 702, the first region 702 may continue to present an overview of the process plant while the third region 706 displays the Level 2 process section display view selected by the operator.

Figure 7B:
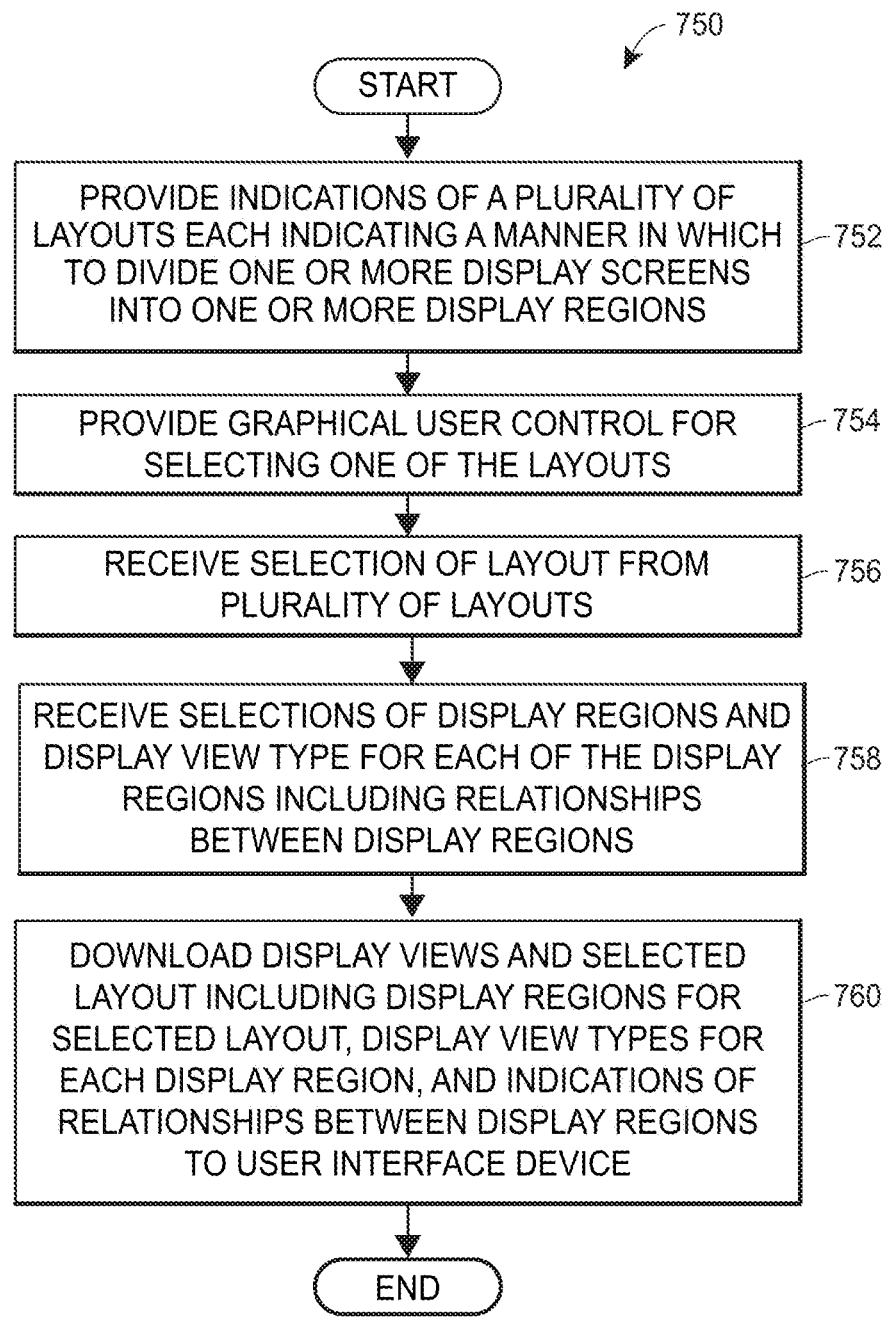
FIG. 7B is a flow diagram of an example method for configuring a layout of an operator display in a process plant.

FIG. 7B illustrates a flow diagram of an example method 750 for configuring a layout of an operator display in a process plant. The method 750 may be performed by the graphical display configuration application 110, the operator application 135, or any suitable combination of these operating on one or more UI devices 8.

At block 752, indications of a plurality of layouts are provided each indicating a manner in which to divide one or several display screens into one or several display regions. For example, as shown in FIG. 4, the graphical display configuration application 110 may include a single-screen layout, dual-screen layout, quad-screen layout, etc. Each layout may be further divided into display regions. For example, a quad-screen layout may be divided into five display regions, where a different display view type is presented in each display region of the quad-screen layout. While a multi-screen layout may be presented on an operator workstation having multiple monitors, the multi-screen layout may also be presented on a single monitor or display and the single display may be divided into multiple display screens according to the multi-screen layout. Additionally, a single-screen layout may be presented on an operator workstation having multiple monitors, where the single-screen layout is sized to fit across each of the multiple monitors.

A graphical user control is provided for selecting one of the plurality of layouts (block 754), such as selectable icons representing each of the layouts 404-412 as shown in FIG. 4. In addition to the graphical user control for selecting one of the layouts, a graphical user control may also be provided for selecting a size of the display screen(s)/user interface(s) of the operator workstation that will present the selected layout in the operating environment 105. For example, the layout menu 402 as shown in FIG. 4 includes an auto detect button 416 for automatically detecting the display screen size of the UI device 8 executing the graphical display configuration application 110. The auto detect button 416 may be selected when the UI device 8 executing the graphical display configuration application 110 is an operator workstation. Otherwise, the blank layout button 414 may be selected to manually configure the screen size for the layout.

Then at block 756, a selection of one of the layouts is received via the graphical user control, such as a selection of the dual-screen button 406 as shown in FIG. 4. In some embodiments, the configuration engineer may select several layouts to configure and may designate different layouts for different operators via the operator application 135 or provide several layouts to the same operator via the operator application 135 for the operator to choose from. For example, upon configuring several layouts in the graphical display configuration application 110, the layouts may be downloaded to a UI device 8 executing an operator application 135 in the operating environment 105 for a particular operator. When the operator application 135 is initiated, the operator application 135 may include a graphical user control (similar to the graphical user control for selecting a layout in the graphical display configuration application 110 as shown in FIG. 4), for selecting one of several layouts configured by the configuration engineer in the graphical display configuration application 110.

In response to the selection of a layout in the graphical display configuration application 110, the selected layout may be presented for defining display regions and corresponding display view types. For example, a dual-screen layout may be presented on the configuration canvas 520 of a layout screen 500 as shown in FIG. 5. The layout screen 500 of the graphical display configuration application 110 may indicate the amount of available display area and may be configured to receive selections of display regions including the placement and/or size of each display region within the layout, and corresponding display view types to present within the layout (block 758).

For example, as shown in FIG. 5, the configuration canvas 520 may include one or several display screens in accordance with the selected layout. Each display screen may be presented with a particular display screen size which may be a default display screen size, may be automatically determined via selection of a graphical user control, such as the auto detect button 416 in FIG. 4, or may be defined by the configuration engineer for example, via graphical user controls in the editing pane 530.

In some embodiments, the graphical display configuration application 110 presents indications of several display view types (e.g., a watch area display view type, an alarm list display view type, an alarm banner display view type, a historized parameters display view type, a faceplate display view type, a process section display view type at one or several levels of detail, etc.) with graphical user controls for selecting one or several of the display view types. The graphical display configuration application 110 may receive selections of display view types at each of the display screens (e.g., via drag-and-drop user controls) to define display regions within the display screens and/or layout. For example, a layout may be a dual-screen layout having two display screens. As such, the layout may also have two display regions each having a display view type. In some scenarios, multiple display view types may be selected for at least one of the display screens, causing the display screen to have multiple display regions each having a display view type.

Also in some embodiments, each display region has a default size so as to divide each display region equally amongst a display screen. Additionally, the default size may depend on the display view type for the display region. For example, an overview display may have a larger default size than an alarm banner. Still further, the size and placement of each display region within the layout may be selected via a graphical user control. For example, a display region may be positioned or re-sized within the layout by clicking and dragging on the boundaries of the display region.

Relationships or links between display regions may also be defined. For example, a first display region within the layout may present indications of process sections with hierarchy Level 1 type display views and a second display region within the layout may present indications of process sections with hierarchy Level 2 type display views. The second display region may be configured to present indications of process sections with hierarchy Level 2 display views when the operator navigates from hierarchy Level 1 in the first display region. The display view for the second display region depends on the activity of the operator with respect to the first display region and the first display region continues to present indications of process sections with hierarchy Level 1 type display views. In another example, display regions within the layout depicting alarm list or historized parameter display views may depend on display regions within the layout depicting sections of a process plant, so that the alarm list or historized parameter display views include alarms or parameters being displayed within the process sections. In some embodiments, the relationships or links are defined via graphical user controls. Each display region may have a set of configurable properties which may be presented via the graphical display configuration application 110 and the configurable properties may include a relationships property indicating dependencies between display regions.

More generally, the graphical display configuration application 110 includes graphical user controls for defining the layout including the number, placement, and size of display screens in the layout (e.g., a dual-screen layout that divides the display horizontally into two equal sized display screens), the number, placement, and size of display regions within the layout, the display view types corresponding to each of the display regions, relationships between display regions, or any other suitable information for defining the layout.

In any event, at block 760, the display views which depict process control elements and an indication of the selected layout including the one or several display screens/display regions for the selected layout and their respective sizes and positions within the selected layout, the display view types for each display region, and indications of relationships between the display regions are downloaded to a UI device 8 executing an operator application 135 in an operating environment 105 of the process plant. For example, a layout display view element representing the selected layout is downloaded to the UI device 8 executing the operator application 135. In some instances, the UI device 8 executing the operator application 135 and the UI device 8 executing the graphical display configuration application 110 are the same UI device 8. In other instances, the UI device 8 executing the operator application 135 and the UI device 8 executing the graphical display configuration application 110 are different UI devices.

In any event, in this manner, the operator application 135 presents the display views according to the display screens and display regions of the selected layout and the display view types for each display region. In some embodiments, a display view hierarchy indicating levels of detail for each of the display views is also downloaded to the UI device 8 executing the operator application 135.

For example, as shown in FIG. 7A the user interface of the UI device 8 executing the operator application 135 is divided into five display regions. The five display regions present display views having a display view type corresponding to process sections at hierarchy Level 1, an alarm list display view type, two additional display view types corresponding to process sections at hierarchy Level 2 or Level 3, and an alarm banner display view type. In this manner, the operator may view an overview of the process plant, Level 2 and Level 3 subviews of the process plant, and an alarm list corresponding to alarms within the Level 1, 2, or 3 display views.

Figure 7C:
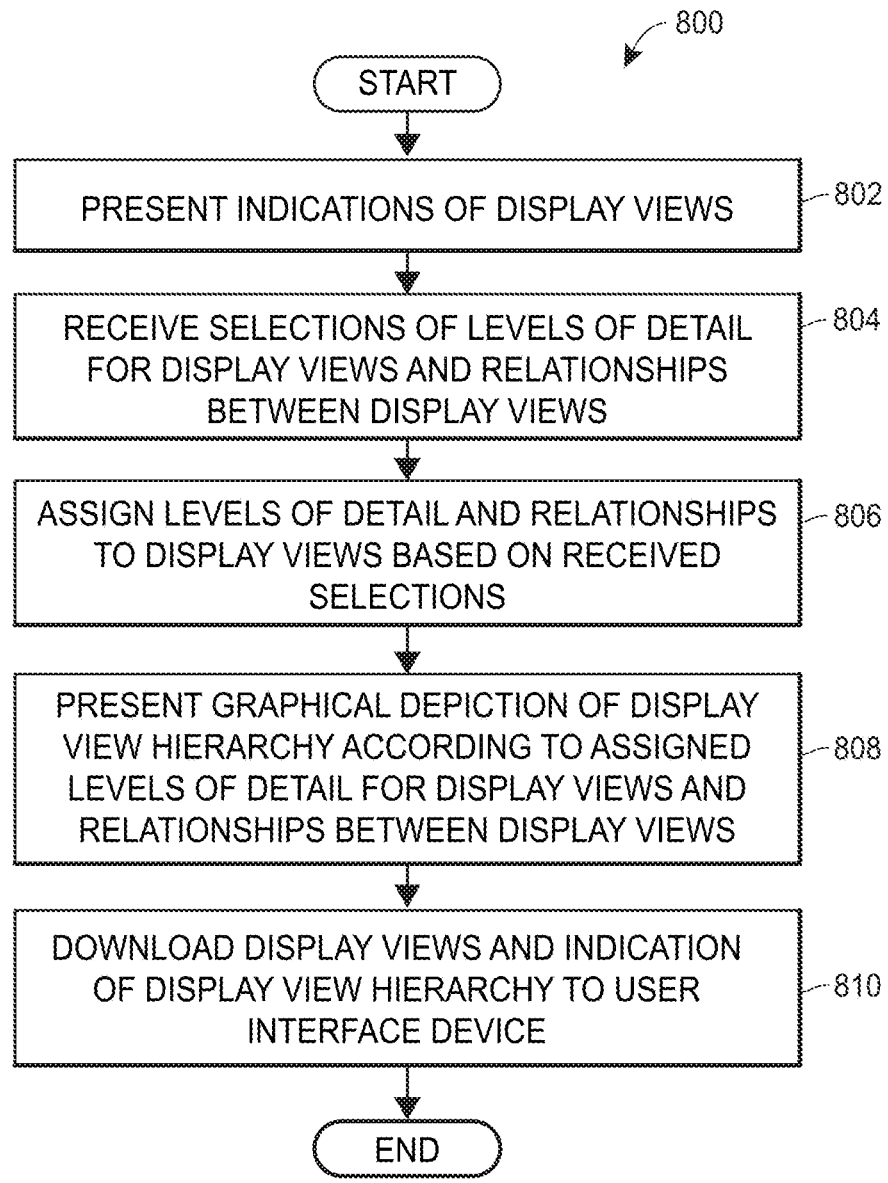
FIG. 7C is a flow diagram of an example method for configuring an operator display navigation hierarchy in a process plant.

FIG. 7C illustrates a flow diagram of an example method 800 for configuring an operator display navigation hierarchy in a process plant. The method 800 may be performed by the graphical display configuration application 110, the operator application 135, or any suitable combination of these operating on one or more UI devices 8.

At block 802, indications of display views depicting process control elements, such as sections of a process plant, trend data for process parameters in the process plant, or any other process control information are presented. For example, the graphical display configuration application 110 may present a user interface or a portion thereof which includes the indications of display views having default levels of detail (e.g., the default level of detail may be Level 1 for each of the display views). The graphical display configuration application 110 may also include a graphical user control for designating a display view as a subview of another display view (e.g., a drag-and-drop function where a display view is defined as a subview of a parent display view when the indication of the display view is dragged and placed on top of the indication of the parent display view), thereby causing the subview to have a level of detail that is one level above the level of detail for the parent display view.

Levels of detail and relationships between parent display views and subviews are then selected for the display views via the graphical user control (block 804). Then, the graphical display configuration application 110 assigns levels of detail and relationships between parent display views and subviews to the display views based on the received selections and/or default levels of detail (block 806). For example, the graphical display configuration application 110 presents indications of a "Tanks-Ovw" display view, a "Tank-Feed" display view, a "Main-Tanks" display view, and a "Tank 1" display view. Each of the display views may have a default level of detail of Level 1. In response to receiving selections of graphical user controls designating the "Tank-Feed" display view and the "Main-Tanks" display view as subviews of the "Tanks-Ovw" display view (e.g., by dragging and dropping indications of the "Tank-Feed" display view and the "Main-Tanks" display view on top of an indication of the "Tanks-Ovw" display view), the "Tank-Feed" display view and the "Main-Tanks" display view are each assigned a level of detail of Level 2. Additionally, in response to receiving a selection of a graphical user control designating the "Tank 1" display view as a subview of the "Main-Tanks" display view, the "Tank 1" display view is assigned a level of detail of Level 3.

In some embodiments, several display view hierarchies may be configured in the configuration environment 102 as hierarchy display view elements, where each of the display view hierarchies correspond to different areas within a process plant or different process plants. In this manner, each operator may view display views according to the display view hierarchy representing the area for which she is responsible. In another example, several display view hierarchies may be configured in the configuration environment 102 as hierarchy display view elements and downloaded to the same operator application 135 for the operator to select one of the display view hierarchies in which to navigate the display views.

Then at block 808, a graphical depiction of the generated display view hierarchy is presented for example, by the graphical display configuration application 110. The graphical depiction may include indications of the display views arranged so as to indicate respective parent/subview relationships. More specifically, an indication of a first display view presented below an indication of a second display view and tabbed to the right of the indication of the second display view may signify that the first display view is a subview of the second display view. An indication of a third display view presented below the indication of the first display view and having the same tab position as the first display view may signify that the first and third display views are at the same level of detail and are both subviews of the second display view. In some embodiments, multiple display view hierarchies may be graphically depicted by the graphical display configuration application 110.

In any event, at block 810, the display views and indications of one or several display view hierarchies for the display views (e.g., one or several hierarchy display view elements) are downloaded to a UI device 8 executing an operator application 135 in an operating environment 105 of the process plant. In some instances, the UI device 8 executing the operator application 135 and the UI device 8 executing the graphical display configuration application 110 are the same UI device 8. In other instances, the UI device 8 executing the operator application 135 and the UI device 8 executing the graphical display configuration application 110 are different UI devices.

In any event, in this manner, the operator application 135 presents the display views according to the respective levels of detail for each of the display views and according to the relationships between the display views.

For example, as shown in FIG. 6A, the operator application 135 may present a navigation bar including navigation buttons corresponding to each of the Level 2 or Level 3 display views. Upon selection of one of the navigation buttons corresponding to a particular display view, a dropdown menu is presented and includes each of the subviews of the particular display view.

In some embodiments, several display view hierarchies are provided to the UI device 8 along with graphical user controls for the operator to select one of the display view hierarchies. The operator may also adjust a display view hierarchy via graphical user controls at the operator application 135 to meet the needs of the operator, which may be similar to the graphical user controls for assigning levels of detail to display views in the graphical display configuration application 110.

Figure 7D:
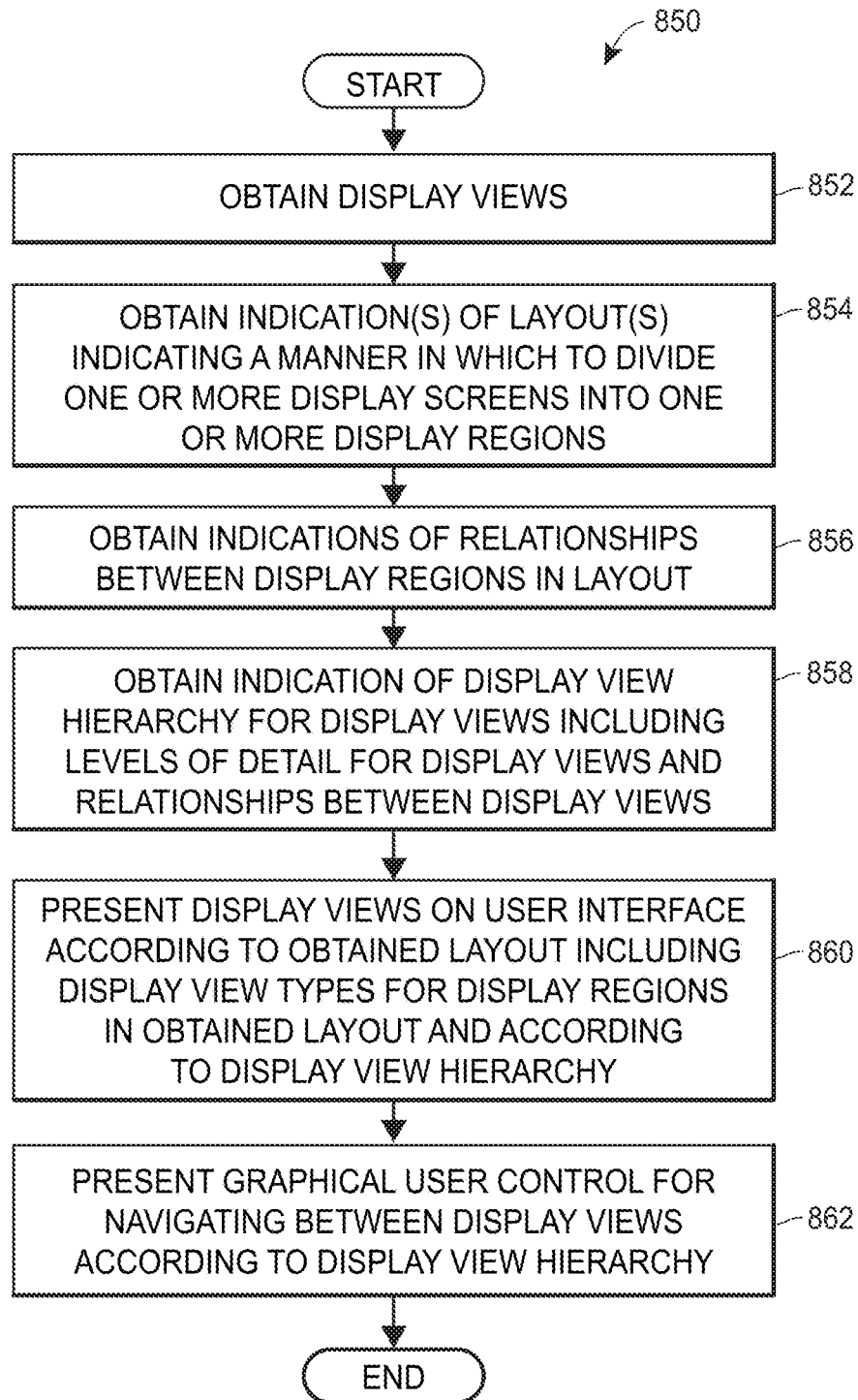
FIG. 7D is a flow diagram of an example method for presenting an operator display in accordance with a layout and/or navigation hierarchy.

FIG. 7D illustrates a flow diagram of an example method 850 for presenting an operator display in accordance with a layout and/or navigation hierarchy. The method 850 may be performed by the operator application 135, the graphical display configuration application 110, or any suitable combination of these operating on one or more UI devices 8.

At block 852, a plurality of display views are obtained, where the display views depict process control elements, such as sections of a process plant, trend data for process parameters in the process plant, or any other process control information. For example, the UI device 8 executing the operator application 135 in the operating environment 105 may obtain the display views from a UI device 8 executing the graphical display configuration application 110. In some instances, the UI device 8 executing the operator application 135 and the UI device 8 executing the graphical display configuration application 110 are the same UI device 8. In other instances, the UI device 8 executing the operator application 135 and the UI device 8 executing the graphical display configuration application 110 are different UI devices.

In any event, the plurality of display views may be provided to each UI device 8 executing an operator application 135, or the display views may be specifically selected for a particular operator. In this scenario, the operator application 135 may include an operator login screen or page, where the operator provides identification information. The plurality of display views are then provided to the UI device 8 executing the operator application 135 that stores a particular set of operator identification information. In this manner, sets of display views representing different areas within a process plant or different process plants may be provided to different operators. Accordingly, each operator may view the display views representing the area for which she is responsible.

In any event, at block 854, indications of one or several layouts are obtained e.g., via layout display view elements, where each layout indicates a manner in which to divide one or several display screens into one or several display regions as well as the size and/or placement of the display regions within the layout. When an indication of a single layout is obtained for example, from the UI device 8 executing the graphical display configuration application 110 that configured the layout, the operator application 135 presents display views on one or several user interfaces according to the obtained layout. When indications of multiple layouts are obtained, the operator application 135 includes a graphical user control for selecting one of the layouts and/or a default layout when none of the layouts are selected. For example, indications of each of the layouts may be presented as selectable icons on the user interface(s). In response to receiving a selection of one of the layouts, the operator application 135 presents display views on the user interface(s) according to the selected layout. Otherwise, the operator application 135 presents display views on the user interface(s) according to the default layout.

As mentioned above, each layout includes one or several display screens and/or one or several display regions, where each display region has a display view type, such as a watch area display view type, an alarm list display view type, an alarm banner display view type, a historized parameters display view type, a faceplate display view type, a process section display view type at one or several levels of detail, etc. In addition to obtaining an indication of the layout including the display regions for the layout and display view types for each display region, the operator application 135 obtains indications of relationships between display regions (block 856). For example, a first display region within the layout may present indications of process sections with hierarchy Level 1 type display views and a second display region within the layout may present indications of process sections with hierarchy Level 2 type display views. The second display region may be configured to present indications of process sections with hierarchy Level 2 display views when the operator navigates from hierarchy Level 1 in the first display region. The display view for the second display region depends on the activity of the operator with respect to the first display region and the first display region continues to present indications of process sections with hierarchy Level 1 type display views. Each display region may have a set of configurable properties which may include a relationships property indicating dependencies between display regions. The relationships property may be provided to the operator application 135 along with the indication of the layout, display screens/display regions for the layout, and display view types for each display region.

In addition to obtaining indications of one or several layouts, indications of one or several display view hierarchies are obtained e.g., via hierarchy display view elements, which define levels of detail and parent/subview relationships for the display views (block 858). When a single indication of a display view hierarchy is obtained for example, from the UI device 8 executing the graphical display configuration application 110 that configured the display view hierarchy, the operator application 135 presents display views and a graphical user control for navigating between the display views on one or several user interfaces according to the obtained display view hierarchy. The operator application 135 also presents an initial display view (e.g., on startup of the operator application 135) according to the initial display view selected in the graphical display configuration application 110. For example, the operator application 135 may obtain a selection of an initial display view to present by name (e.g., "Column") or by position within the obtained display view hierarchy. For example, when the operator application 135 obtains the position "2-3" as the selected initial display view, the operator application 135 initially presents the third Level 2 display view which is a subview of the second Level 1 display view within the obtained display view hierarchy.

When multiple indications of display view hierarchies are obtained, the operator application 135 includes a graphical user control for selecting one of the display view hierarchies and/or a default display view hierarchy when none of the display view hierarchies are selected. For example, indications of each of the display view hierarchies may be presented as selectable icons on the user interface. In response to receiving a selection of one of the display view hierarchies, the operator application 135 presents display views and a graphical user control for navigating between the display views on the user interface according to the selected display view hierarchy. Otherwise, the operator application 135 presents display views and the graphical user control for navigating between the display views on the user interface according to the default display view hierarchy.

In any event, the display views are presented on the user interface(s) of the UI device 8 executing the operating application 135 in the operating environment of the process plant according to the obtained layout and the display view hierarchy (block 860). More specifically, the user interface(s) is divided into display screens and/or display regions according to the size and placement of the display screens/display regions in the obtained layout. The obtained layout also includes indications of display view types for each display region.

For example, the UI device 8 may be an operator workstation including four monitors and the obtained layout may be a quad-screen layout having a display region for each display screen, resulting in four display regions in total. Accordingly, a first display region corresponding to a hierarchy Level 1 process section display view type may be presented in the top-left monitor, a second display region corresponding to a hierarchy Level 2/3 process section display view type may be presented in the bottom-left monitor, a third display region corresponding to a hierarchy watch area display view type may be presented in the top-right monitor, and a fourth display region corresponding to a historized parameters display view type may be presented in the bottom-right monitor.

In another example, the UI device 8 may be an operator workstation including a single monitor and the obtained layout may be dual-screen layout having two display regions for the first display screen and one display region for the second display screen. Accordingly, the monitor display may be divided into two display screens and one of the display screens may be further subdivided into two display regions for presenting three display views at the same time. For example, a first display region may encompass a large portion of the area of the first display screen and may present display views corresponding to a hierarchy Level 1 process section display view type. A second display region may encompass the remaining portion of the area of the second display screen and may present display views corresponding to an alarm banner display view type. A third display region may be included in the second display screen and may present display views corresponding to a hierarchy Level 2/3 process section display view type.

Additionally, the display regions of the user interface(s) present display views in accordance with the obtained display view hierarchy. More specifically, a display region corresponding to a hierarchy Level 1 display view type presents display views having a level of detail of Level 1. A display region corresponding to a hierarchy Level 2/3 display view type presents display views having a level of detail of Level 2 or 3. The display regions may also be presented with graphical user controls for navigating between display views according to the obtained display view hierarchy (block 862), such as a navigation bar having one or several navigation buttons. As shown in FIG. 6A, each navigation button may include an indication of a different display view at the same level of detail (e.g., "Column," "Mixers," "Heater"). Upon selection of one of navigation buttons corresponding to a particular display view, a drop-down menu is presented and includes indications of each of subviews of the particular display view at higher levels of detail than the particular display view. Upon selection of one of the indications of the subviews of the particular display view, the selected subview is presented in the corresponding display region of the user interface(s).

Embodiments of the techniques described in the present disclosure may include any number of the following aspects, either alone or combination:

1. A method for configuring an operator display navigation hierarchy in a process plant, the method comprising: presenting, via a user interface of a computing device executing a graphical display configuration application in a configuration environment of a process plant, indications of a plurality of display views, each display view including indications of control elements included in an operating environment of the process plant; receiving, at the graphical display configuration application, selections of levels of detail for the plurality of display views; assigning, by the graphical display configuration application, a level of detail to each of the plurality of display views in accordance with the received selections to generate a display view hierarchy for the plurality of display views, such that in an operating environment of the process plant, an operator application navigates from a first display view at a lower level of detail to a second display view at a higher level of detail; and downloading the display view hierarchy including the plurality of display views and respective levels of detail for the plurality of display views from the configuration environment into a user interface device for execution in the operating environment of the process plant to thereby cause a presentation, at the user interface device, of the plurality of display views organized according to the display view hierarchy.

2. A method according to aspect 1, wherein assigning a level of detail to each of the plurality of display views in accordance with the received selections includes designating one or more of the plurality of display views as subviews for a corresponding one of the plurality of display views, wherein the one or more subviews are assigned a higher level of detail than the corresponding display view.

3. A method according to any one of the preceding aspects, wherein receiving selections of levels of detail for the plurality of display views includes receiving, via a graphical user control, a request to designate a first display view as a subview of a second display view, wherein the first display view is assigned a higher level of detail than the second display view.

4. A method according to any one of the preceding aspects, further comprising: presenting, via the user interface of the computing device executing the graphical display configuration application, a graphical depiction of the display view hierarchy, wherein indications of each of the plurality of display views are positioned in the graphical depiction to indicate respective levels of detail for the plurality of display views and relationships between display views designated as subviews of another display view.

5. A method according to any one of the preceding aspects, further comprising: presenting, via the user interface of the computing device executing the graphical display configuration application, an interactive graphical depiction of the display view hierarchy as a preview of the display view hierarchy presented at the user interface device for execution in the operating environment of the process plant, including presenting a navigation bar with graphical user controls to toggle between display views and subviews within the display view hierarchy.

6. A method according to any one of the preceding aspects, further comprising: presenting one of the plurality of display views in accordance with an indicated display view in the navigation bar; and in response to receiving a selection of one of the graphical user controls in the navigation bar to navigate to another of the plurality of display views, presenting the other display view.

7. A method according to any one of the preceding aspects, wherein the plurality of display views depict process sections of the process plant.

8. A computing device for configuring an operator display navigation hierarchy in a process plant, the computing device comprising: one or more processors; a user interface; a communication unit; and a non-transitory computer-readable medium coupled to the one or more processors, the user interface, and the communication unit, the non-transitory computer-readable medium storing a graphical display configuration application thereon executing in a configuration environment of a process plant that, when executed by the one or more processors, causes the computing device to: present, via the user interface, indications of a plurality of display views, each display view including indications of control elements included in an operating environment of the process plant; receive selections of levels of detail for the plurality of display views; assign a level of detail to each of the plurality of display views in accordance with the received selections to generate a display view hierarchy for the plurality of display views, such that in an operating environment of the process plant, an operator application navigates from a first display view at a lower level of detail to a second display view at a higher level of detail; and download, via the communication unit, the display view hierarchy including the plurality of display views and respective levels of detail for the plurality of display views from the configuration environment into a user interface device for execution in the operating environment of the process plant to thereby cause a presentation, at the user interface device, of the plurality of display views organized according to the display view hierarchy.

9. The computing device according to aspect 8, wherein to assign a level of detail to each of the plurality of display views in accordance with the received selections, the graphical display configuration application causes the computing device to designate one or more of the plurality of display views as subviews for a corresponding one of the plurality of display views, wherein the one or more subviews are assigned a higher level of detail than the corresponding display view.

10. The computing device according to either one of aspect 8 or aspect 9, wherein to receive selections of levels of detail for the plurality of display views, the graphical display configuration application causes the computing device to receive, via a graphical user control, a request to designate a first display view as a subview of a second display view, wherein the first display view is assigned a higher level of detail than the second display view.

11. The computing device according to any of aspects 8-10, wherein the graphical display configuration application further causes the computing device to: present, via the user interface of the computing device executing the graphical display configuration application, a graphical depiction of the display view hierarchy, wherein indications of each of the plurality of display views are positioned in the graphical depiction to indicate respective levels of detail for the plurality of display views and relationships between display views designated as subviews of another display view.

12. The computing device according to any of aspects 8-11, wherein the graphical display configuration application further causes the computing device to: present, via the user interface of the computing device executing the graphical display configuration application, an interactive graphical depiction of the display view hierarchy as a preview of the display view hierarchy presented at the user interface device for execution in the operating environment of the process plant, the interactive graphical depiction including a navigation bar with graphical user controls to toggle between display views and subviews within the display view hierarchy.

13. The computing device according to any of aspects 8-12, wherein the graphical display configuration application further causes the computing device to: present one of the plurality of display views in accordance with an indicated display view in the navigation bar; and in response to receiving a selection of one of the graphical user controls in the navigation bar to navigate to another of the plurality of display views, present the other display view.

14. The computing device according to any of aspects 8-13, wherein the plurality of display views depict process sections of the process plant.

15. A system for configuring an operator display navigation hierarchy in a process plant, the system comprising: one or more devices disposed in the process plant each performing a physical function to control an industrial process; and a computing device executing in a configuration environment of a process plant including: one or more processors; a user interface; and a non-transitory computer-readable medium coupled to the one or more processors and the user interface, the non-transitory computer-readable medium storing a graphical display configuration application thereon, when executed by the one or more processors, causes the computing device to: present, via the user interface, indications of a plurality of display views, each display view including indications of process control elements corresponding to the one or more devices disposed in the process plant; receive selections of levels of detail for the plurality of display views; assign a level of detail to each of the plurality of display views in accordance with the received selections to generate a display view hierarchy for the plurality of display views, such that in an operating environment of the process plant, an operator application navigates from a first display view at a lower level of detail to a second display view at a higher level of detail; and download the display view hierarchy including the plurality of display views and respective levels of detail for the plurality of display views from the configuration environment into a user interface device for execution in the operating environment of the process plant to thereby cause a presentation, at the user interface device, of the plurality of display views organized according to the display view hierarchy.

16. The system according to aspect 15, wherein to assign a level of detail to each of the plurality of display views in accordance with the received selections, the graphical display configuration application causes the computing device to designate one or more of the plurality of display views as subviews for a corresponding one of the plurality of display views, wherein the one or more subviews are assigned a higher level of detail than the corresponding display view.

17. The system according to either one of aspects 15 or 16, wherein to receive selections of levels of detail for the plurality of display views, the graphical display configuration application causes the computing device to receive, via a graphical user control, a request to designate a first display view as a subview of a second display view, wherein the first display view is assigned a higher level of detail than the second display view.

18. The system according to any of aspects 15-17, wherein the graphical display configuration application further causes the computing device to: present, via the user interface of the computing device executing the graphical display configuration application, a graphical depiction of the display view hierarchy, wherein indications of each of the plurality of display views are positioned in the graphical depiction to indicate respective levels of detail for the plurality of display views and relationships between display views designated as subviews of another display view.

19. The system according to any of aspects 15-18, wherein the graphical display configuration application further causes the computing device to: present, via the user interface of the computing device executing the graphical display configuration application, an interactive graphical depiction of the display view hierarchy as a preview of the display view hierarchy presented at the user interface device for execution in the operating environment of the process plant, the interactive graphical depiction including a navigation bar with graphical user controls to toggle between display views and subviews within the display view hierarchy.

20. The system according to any of aspects 15-19, wherein the graphical display configuration application further causes the computing device to: present one of the plurality of display views in accordance with an indicated display view in the navigation bar; and in response to receiving a selection of one of the graphical user controls in the navigation bar to navigate to another of the plurality of display views, present the other display view.

21. A method for configuring a layout of an operator display in a process plant, the method comprising: presenting, via a user interface of a computing device executing a graphical display configuration application in a configuration environment of a process plant, a graphical user control for selecting one of a plurality of layouts in which display views depicting control elements included in an operating environment of the process plant are presented in an operator application in the operating environment of the process plant, wherein each of the plurality of layouts divides one or more user interfaces into one or more display regions; receiving, via the graphical user control, a selection of one of the plurality of layouts; and downloading the selected layout and a plurality of display views into a user interface device for execution in the operating environment of the process plant to thereby cause a presentation, at the user interface device, of the plurality of display views within the one or more display regions according to the selected layout.

22. The method according to aspect 21, wherein each of the one or more display regions has a display view type and presents display views matching the display view type.

23. The method according to either one of aspect 21 or aspect 22, further comprising: for each of the one or more display regions corresponding to the selected layout, receiving, via the graphical user control, a selection of a display view type for presenting display views matching the selected display view type.

24. The method according to any one of aspects 21-23, wherein downloading the selected layout and the plurality of display views into the user interface device includes downloading the selected layout, the selected display view types for each display region in the selected layout, and the plurality of display views into the user interface device for execution in the operating environment of the process plant to thereby cause the presentation, at the user interface device, of the plurality of display views within the one or more display regions according to the selected layout and the selected display view types for each display region.

25. The method according to any one of aspects 21-24, wherein receiving, via the graphical user control, a selection of a display view type includes receiving a selection of at least one of: a watch area display view type; an alarm banner display view type; a historized parameters display view type; or a process section display view type at one or more levels of detail.

26. The method according to any one of aspects 21-25, wherein receiving a selection of one of the plurality of layouts includes receiving a selection of a single-screen layout and the user interface device for execution in the operating environment includes one user interface.

27. The method according to any one of aspects 21-26, wherein receiving a selection of one of the plurality of layouts includes receiving a selection of a quad-screen layout and the user interface device for execution in the operating environment includes one user interface.

28. The method according to any one of aspects 21-27, further comprising: obtaining a screen size of the user interface device executing the operator application; and presenting a preview of the one or more user interfaces according to the selected layout and the screen size of the user interface device executing the operator application.

29. The method according to any one of aspects 21-27, wherein obtaining a screen size of the user interface device includes receiving a request to automatically detect the screen size of the computing device executing the graphical display configuration application, wherein the user interface device executing the operator application and the computing device executing the graphical display configuration application are a same device.

30. The method according to any one of aspects 21-29, wherein the plurality of layouts include at least one of: a single-screen layout; a dual-screen layout; a quad-screen layout; an overhead and dual-screen layout; or a wall-screen and dual-screen layout.

31. A computing device for configuring a layout of an operator display in a process plant, the computing device comprising: one or more processors; a user interface; a communication unit; and a non-transitory computer-readable medium coupled to the one or more processors, the user interface, and the communication unit, the non-transitory computer-readable medium storing a graphical display configuration application thereon executing in a configuration environment of a process plant that, when executed by the one or more processors, causes the computing device to: present, via the user interface, a graphical user control for selecting one of a plurality of layouts in which display views depicting control elements included in an operating environment of the process plant are presented in an operator application in the operating environment of the process plant, wherein each of the plurality of layouts divides one or more user interfaces into one or more display regions;

receive, via the graphical user control, a selection of one of the plurality of layouts; and download the selected layout and a plurality of display views into a user interface device for execution in the operating environment of the process plant to thereby cause a presentation, at the user interface device, of the plurality of display views within the one or more display regions according to the selected layout.

32. The computing device according to aspect 31, wherein each of the one or more display regions has a display view type and presents display views matching the display view type.

33. The computing device according to either one of aspects 31 or 32, wherein the graphical display configuration application further causes the computing device to: for each of the one or more display regions corresponding to the selected layout, receive, via the graphical user control, a selection of a display view type for presenting display views matching the selected display view type.

34. The computing device according to any one of aspects 31-33, wherein to download the selected layout and the plurality of display views into the user interface device, the graphical display configuration application causes the computing device to download the selected layout, the selected display view types for each display region in the selected layout, and the plurality of display views into the user interface device for execution in the operating environment of the process plant to thereby cause the presentation, at the user interface device, of the plurality of display views within the one or more display regions according to the selected layout and the selected display view types for each display region.

35. The computing device according to any one of aspects 31-34, wherein the display view type includes at least one of: a watch area display view type; an alarm banner display view type; a historized parameters display view type; or a process section display view type at one or more levels of detail.

36. The computing device according to any one of aspects 31-35, wherein to receive a selection of one of the plurality of layouts, the graphical display configuration application further causes the computing device to receive a selection of a single-screen layout and the user interface device for execution in the operating environment includes one user interface.

37. The computing device according to any one of aspects 31-36, wherein to receive a selection of one of the plurality of layouts, the graphical display configuration application further causes the computing device to receive a selection of a quad-screen layout and the user interface device for execution in the operating environment includes one user interface.

38. The computing device according to any one of aspects 31-37, wherein the graphical display configuration application further causes the computing device to: obtain a screen size of the user interface device executing the operator application; and present a preview of the one or more user interfaces according to the selected layout and the screen size of the user interface device executing the operator application.

39. The computing device according to any one of aspects 31-38, wherein to obtain a screen size of the user interface device, the graphical display configuration application causes the computing device to receive a request to automatically detect the screen size of the computing device executing the graphical display configuration application, wherein the user interface device executing the operator application and the computing device executing the graphical display configuration application are a same device.

40. The computing device according to any one of aspects 31-39, wherein the plurality of layouts include at least one of: a single-screen layout; a dual-screen layout; a quad-screen layout; an overhead and dual-screen layout; or a wall-screen and dual-screen layout.

41. A method for presenting an operator display in accordance with a layout, the method comprising: obtaining, by a computing device executing an operator application in an operating environment of a process plant, a plurality of display views depicting control elements included in the operating environment of the process plant; obtaining, by the operator application, a layout for presenting the plurality of display views, wherein the layout divides a user interface into one or more display regions and defines a display view type for each of the one or more display regions for presenting the plurality of display views; presenting, via a user interface of the computing device, the one or more display regions according to the layout; and presenting, via the user interface, one or more of the plurality of the display views in the one or more display regions according to the display view type for each display region.

42. The method according to aspect 41, further comprising: obtaining, by the operator application, indications of levels of detail for each of the plurality of display views including indications that at least some of the plurality of display views are subviews of at least another of the plurality of display views; and presenting, by the operator application, a graphical user control for navigating from a first display view at a first level of detail to a second display view at a second level of detail.

43. The method according to either one of aspects 41 or 42, further comprising: obtaining, by the operator application, indications of relationships between the one or more display regions within the layout.

44. The method according to any one of aspects 41-43, wherein obtaining indications of relationships between the one or more display regions within the layout includes: obtaining an indication of a link between a first display region having a display view type corresponding to display views for a first level of detail and a second display region having a display view type corresponding to display views for a second level of detail; and in response to receiving a selection of the graphical user control for navigating from the first display view at the first level of detail to the second display view at the second level of detail, presenting, by the operator application, the first display view in the first display region and the second display view in the second display region.

45. The method according to any one of aspects 41-44, wherein presenting one or more of the plurality of the display views includes presenting an initial display view according to the indications of levels of detail for each of the plurality of display views or an obtained indication of the initial display view; and wherein presenting a graphical user control for navigating from a first display view at a first level of detail to a second display view at a second level of detail includes presenting a plurality of graphical user controls, each graphical user control for navigating from a different initial display view to a plurality of subviews of the different initial display view.

46. The method according to any one of aspects 41-45, wherein obtaining a layout for presenting the plurality of display views includes: obtaining, by the operator application, a plurality of layouts for presenting the plurality of display views; receiving, at the operator application, a selection of one of the plurality of layouts; and presenting, via the user interface of the computing device, the one or more display regions according to the selected layout.

47. The method according to any one of aspects 41-46, wherein the user interface includes a single user interface and the one or more display regions includes a plurality of display regions.

48. The method according to any one of aspects 41-47, wherein the user interface includes a same number of user interfaces as a number of the one or more display regions.

49. The method according to any one of aspects 41-48, wherein the layout includes at least one of: a single-screen layout; a dual-screen layout; a quad-screen layout; an overhead and dual-screen layout; or a wall-screen and dual-screen layout.

50. The method according to any one of aspects 41-49, wherein obtaining a layout defining a display view type for each of the one or more display regions includes obtaining a layout that for each of the one or more display regions defines the respective display view type as at least one of: a watch area display view type; an alarm banner display view type; a historized parameters display view type; or a process section display view type at one or more levels of detail.

51. A computing device for an operator display in accordance with a layout, the computing device comprising: one or more processors; a user interface; and a non-transitory computer-readable medium coupled to the one or more processors, the user interface, and the communication unit, the non-transitory computer-readable medium storing an operator application thereon executing in an operating environment of a process plant that, when executed by the one or more processors, causes the computing device to: obtain a plurality of display views depicting control elements included in the operating environment of the process plant; obtain a layout for presenting the plurality of display views, wherein the layout divides a user interface into one or more display regions and defines a display view type for each of the one or more display regions for presenting the plurality of display views; present, via the user interface, the one or more display regions according to the layout; and present, via the user interface, one or more of the plurality of the display views in the one or more display regions according to the display view type for each display region.

52. The computing device according to aspect 51, wherein the operator application further causes the computing device to: obtain indications of levels of detail for each of the plurality of display views including indications that at least some of the plurality of display views are subviews of at least another of the plurality of display views; and present, via the user interface, a graphical user control for navigating from a first display view at a first level of detail to a second display view at a second level of detail.

53. The computing device according to either one of aspects 51 or 52, wherein the operator application further causes the computing device to: obtain indications of relationships between the one or more display regions within the layout.

54. The computing device according to any one of aspects 51-53, wherein to obtain indications of relationships between the one or more display regions within the layout, the operator application causes the computing device to: obtain an indication of a link between a first display region having a display view type corresponding to display views for a first level of detail and a second display region having a display view type corresponding to display views for a second level of detail; and in response to receiving a selection of the graphical user control for navigating from the first display view at the first level of detail to the second display view at the second level of detail, present, via the user interface, the first display view in the first display region and the second display view in the second display region.

55. The computing device according to any one of aspects 51-54, wherein the graphical user control includes a plurality of graphical user controls, each graphical user control for navigating from a different initial display view to a plurality of subviews of the different initial display view.

56. The computing device according to any one of aspects 51-55, wherein to obtain a layout for presenting the plurality of display views, the operator application causes the computing device to: obtain a plurality of layouts for presenting the plurality of display views; receive a selection of one of the plurality of layouts; and present, via the user interface, the one or more display regions according to the selected layout.

57. The computing device according to any one of aspects 51-56, wherein the user interface includes a single user interface and the one or more display regions includes a plurality of display regions.

58. The computing device according to any one of aspects 51-57, wherein the user interface includes a same number of user interfaces as a number of the one or more display regions.

59. The computing device according to any one of aspects 51-58, wherein the layout includes at least one of: a single-screen layout; a dual-screen layout; a quad-screen layout; an overhead and dual-screen layout; or a wall-screen and dual-screen layout.

60. The computing device according to any one of aspects 51-59, wherein the display view type for each of the one or more display regions includes at least one of: a watch area display view type; an alarm banner display view type; a historized parameters display view type; or a process section display view type at one or more levels of detail.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 1B. The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method for configuring a layout of an operator display in a process plant, the method comprising:
presenting, via a user interface of a computing device executing a graphical display configuration application in a configuration environment of a process plant, a graphical user control for selecting one of a plurality of layouts in which display views depicting process control elements included in an operating environment of the process plant are presented in an operator application in the operating environment of the process plant, wherein each of the plurality of layouts divides one or more user interfaces into a plurality of display regions, wherein each of the plurality of layouts defines the plurality of display regions for dividing a display screen area in the operating environment, and wherein at least one of the plurality of layouts includes at least a first display region and a second display region each being a separate, rectangular visible area, and includes a link between at least the first display region and the second display region, such that the second display region is dependent on the process control elements of the first display region so that data presented in the second display region related to the process control elements being graphically displayed in the first display region changes when the process control elements graphically displayed in the first display region change in response to a selection of a user control by a user to navigate to a display view of a graphical representation of a different set of process control elements;
receiving, via the graphical user control, a selection of the at least one layout of the plurality of layouts; and
downloading, to the operator application, the selected layout having the plurality of defined display regions and a plurality of display views into a user interface device different from the computing device for execution in the operating environment of the process plant to thereby cause a presentation, at the user interface device, of the plurality of display views within the plurality of defined display regions according to the selected layout.

2. The method of claim 1, wherein each of the plurality of display regions has a display view type and presents display views matching the display view type.

3. The method of claim 2, further comprising: for each of the plurality of display regions corresponding to the selected layout, receiving, via the graphical user control, a selection of a display view type for presenting display views matching the selected display view type.

4. The method of claim 3, wherein downloading the selected layout and the plurality of display views into the user interface device includes downloading the selected layout, the selected display view types for each display region in the selected layout, and the plurality of display views into the user interface device for execution in the operating environment of the process plant to thereby cause the presentation, at the user interface device, of the plurality of display views within the plurality of display regions according to the selected layout and the selected display view types for each display region.

5. The method of claim 3, wherein receiving, via the graphical user control, a selection of a display view type includes receiving a selection of at least one of:
   a watch area display view type;
   an alarm banner display view type;
   a historized parameters display view type; or
   a process section display view type at one or more levels of detail.

6. The method of claim 1, wherein receiving a selection of one of the plurality of layouts includes receiving a selection of a single-screen layout and the user interface device for execution in the operating environment includes one user interface.

7. The method of claim 1, wherein receiving a selection of one of the plurality of layouts includes receiving a selection of a quad-screen layout and the user interface device for execution in the operating environment includes one user interface.

8. The method of claim 1, further comprising:
   obtaining a screen size of the user interface device executing the operator application; and
   presenting a preview of the one or more user interfaces according to the selected layout and the screen size of the user interface device executing the operator application.

9. The method of claim 1, wherein the plurality of layouts include at least one of:
   a single-screen layout;
   a dual-screen layout;
   a quad-screen layout;
   an overhead and dual-screen layout; or
   a wall-screen and dual-screen layout.

10. A computing device for configuring a layout of an operator display in a process plant, the computing device comprising:
    one or more processors;
    a user interface;
    a communication unit; and
    a non-transitory computer-readable medium coupled to the one or more processors, the user interface, and the communication unit, the non-transitory computer-readable medium storing a graphical display configuration application thereon executing in a configuration environment of a process plant that, when executed by the one or more processors, causes the computing device to:
    present, via the user interface, a graphical user control for selecting one of a plurality of layouts in which display views depicting process control elements included in an operating environment of the process plant are presented in an operator application in the operating environment of the process plant, wherein each of the plurality of layouts divides one or more user interfaces into a plurality of display regions, wherein each of the plurality of layouts defines the plurality of display regions for dividing a display screen area in the operating environment, and wherein at least one of the plurality of layouts includes at least a first display region and a second display region each being a separate, rectangular visible area, and includes a link between at least the first display region and the second display region, such that the second display region is dependent on the process control elements of the first display region so that data presented in the second display region related to the process control elements being graphically displayed in the first display region changes when the process control elements graphically displayed in the first display region change in response to a selection of a user control by a user to navigate to a display view of a graphical representation of a different set of process control elements;
    receive, via the graphical user control, a selection of the at least one layout of the plurality of layouts; and
    download, to the operator application, the selected layout having the plurality of defined display regions and a plurality of display views into a user interface device different from the computing device for execution in the operating environment of the process plant to thereby cause a presentation, at the user interface device, of the plurality of display views within the plurality of defined display regions according to the selected layout.

11. The computing device of claim 10, wherein each of the plurality of display regions has a display view type and presents display views matching the display view type.

12. The computing device of claim 11, wherein the graphical display configuration application further causes the computing device to: for each of the plurality of display regions corresponding to the selected layout, receive, via the graphical user control, a selection of a display view type for presenting display views matching the selected display view type.

13. The computing device of claim 12, wherein to download the selected layout and the plurality of display views into the user interface device, the graphical display configuration application causes the computing device to download the selected layout, the selected display view types for each display region in the selected layout, and the plurality of display views into the user interface device for execution in the operating environment of the process plant to thereby cause the presentation, at the user interface device, of the plurality of display views within the plurality of display regions according to the selected layout and the selected display view types for each display region.

14. The computing device of claim 12, wherein the display view type includes at least one of: a watch area display view type; an alarm banner display view type; a historized parameters display view type; or a process section display view type at one or more levels of detail.

15. The computing device of claim 10, wherein to receive a selection of one of the plurality of layouts, the graphical display configuration application further causes the computing device to receive a selection of a single-screen layout and the user interface device for execution in the operating environment includes one user interface.

16. The computing device of claim 10, wherein to receive a selection of one of the plurality of layouts, the graphical display configuration application further causes the computing device to receive a selection of a quad-screen layout and the user interface device for execution in the operating environment includes one user interface.

17. The computing device of claim 10, wherein the graphical display configuration application further causes the computing device to: obtain a screen size of the user interface device executing the operator application; and present a preview of the one or more user interfaces according to the selected layout and the screen size of the user interface device executing the operator application.

\* \* \* \* \*